United States Patent
Bidram

(10) Patent No.: US 10,406,695 B2
(45) Date of Patent: Sep. 10, 2019

(54) MOBILE WORK STATION FOR TRANSPORTING A PLURALITY OF ARTICLES

(71) Applicant: ADVANCED INTELLIGENT SYSTEMS INC., Burnaby (CA)

(72) Inventor: Farhang Bidram, West Vancouver (CA)

(73) Assignee: Advanced Intelligent Systems Inc., Burnaby, British Columbia (CA)

( * ) Notice: Subject to any disclaimer, the term of this patent is extended or adjusted under 35 U.S.C. 154(b) by 0 days.

(21) Appl. No.: 16/393,676

(22) Filed: Apr. 24, 2019

(65) Prior Publication Data

US 2019/0248024 A1     Aug. 15, 2019

Related U.S. Application Data

(63) Continuation of application No. 16/303,040, filed as application No. PCT/CA2017/000057 on Mar. 10, 2017.

(Continued)

(51) Int. Cl.
*G06F 7/00*     (2006.01)
*B25J 15/02*   (2006.01)
(Continued)

(52) U.S. Cl.
CPC ........... *B25J 15/0206* (2013.01); *B25J 5/007* (2013.01); *B60P 1/48* (2013.01); *G05D 1/0234* (2013.01);

(Continued)

(58) Field of Classification Search
None
See application file for complete search history.

(56) References Cited

U.S. PATENT DOCUMENTS 4,698,775 A    10/1987  Koch et al.
5,682,313 A    10/1997  Edlund et al.
(Continued)

FOREIGN PATENT DOCUMENTS

CA      2622940 A1     3/2007
CN      205219095      5/2016
(Continued)

OTHER PUBLICATIONS

International Search Report issued by the Canadian Intellectual Property Office in connection with International Patent Application No. PCT/CA2017/000057, dated Jul. 25, 2017, 7 pages.

(Continued)

*Primary Examiner* — Yolanda R Cumbess

(57) ABSTRACT

An apparatus and method for transporting a plurality of articles is disclosed. The apparatus includes a wheeled chassis, and a platform disposed on the wheeled chassis. The apparatus also includes a manipulator coupled to the wheeled chassis and operably configured to load a first article of the plurality of articles at a first position on the platform, or unload the first article of the plurality of articles from the first position on the platform. The apparatus further includes at least one actuator operably configured to cause successive relative rotational movements between the manipulator and the platform to provide access to successive rotationally spaced apart positions on the platform for loading or unloading each subsequent article in the plurality of articles.

23 Claims, 13 Drawing Sheets

Related U.S. Application Data

(60) Provisional application No. 62/383,747, filed on Sep. 6, 2016.

(51) Int. Cl.
*B60P 1/48* (2006.01)
*B25J 5/00* (2006.01)
*G05D 1/02* (2006.01)

(52) U.S. Cl.
CPC ... *G05D 1/0242* (2013.01); *G05D 2201/0216* (2013.01)

(56) References Cited

U.S. PATENT DOCUMENTS

| | | | |
|---|---|---|---|
| 6,898,484 B2 | 5/2005 | Lemelson et al. | |
| 8,676,425 B2 | 3/2014 | Jones et al. | |
| 8,915,692 B2 | 12/2014 | Grinnell et al. | |
| 2003/0232581 A1* | 12/2003 | Ki | B24B 37/04 451/64 |
| 2005/0222713 A1 | 10/2005 | Kawabe et al. | |
| 2012/0029697 A1 | 2/2012 | Ota et al. | |
| 2012/0323690 A1* | 12/2012 | Michael | G06Q 30/02 705/14.58 |
| 2013/0110281 A1 | 5/2013 | Jones et al. | |
| 2015/0258693 A1* | 9/2015 | Yazawa | B25J 19/0054 74/490.03 |
| 2016/0075014 A1 | 3/2016 | Bruemmer | |
| 2018/0086489 A1* | 3/2018 | Rogers | B25J 9/042 |

FOREIGN PATENT DOCUMENTS

| | | |
|---|---|---|
| CN | 106272415 A | 1/2017 |
| EP | 0304342 A2 | 2/1989 |
| JP | 2009196381 A | 9/2009 |

OTHER PUBLICATIONS

Written Opinion of the International Searching Authority issued by the Canadian Intellectual Property Office in connection with International Patent Application No. PCT/CA2017/000057, dated Jul. 25, 2017, 7 pages.

\* cited by examiner

MOBILE WORK STATION FOR TRANSPORTING A PLURALITY OF ARTICLES

BACKGROUND

1. Field

This disclosure relates generally to transporting articles and more particularly to a robotic mobile work station for transporting and performing operations on a plurality of articles.

2. Description of Related Art

Robotic vehicles may be configured for autonomous or semi-autonomous operation for a wide range of applications including product transportation, material handling, security, and military missions. Autonomous mobile robotic vehicles typically have the ability to navigate and to detect objects automatically and may be used alongside human workers, thereby potentially reducing the cost and time required to complete otherwise inefficient operations such as basic labor, transportation and maintenance. Some autonomous vehicles track movement of driven wheels of the vehicle using encoders to determine a position of the vehicle within a workspace.

SUMMARY

In accordance with one disclosed aspect there is provided an apparatus for transporting a plurality of articles. The apparatus includes a wheeled chassis, and a platform disposed on the wheeled chassis. The apparatus also includes a manipulator coupled to the wheeled chassis and operably configured to load a first article of the plurality of articles at a first position on the platform, or unload the first article of the plurality of articles from the first position on the platform. The apparatus further includes at least one actuator operably configured to cause successive relative rotational movements between the manipulator and the platform to provide access to successive rotationally spaced apart positions on the platform for loading or unloading each subsequent article in the plurality of articles.

The at least one actuator may be operably configured to cause one of a rotary movement of the platform about the wheeled chassis and a rotary movement of the manipulator about the wheeled chassis.

The manipulator may be coupled to base rotatable with respect to the wheeled chassis and the at least one actuator may include a base actuator operably configured to cause rotary movement of the base and the manipulator about the wheeled chassis, a platform actuator operably configured to cause rotary movement of the platform about the wheeled chassis, the base actuator and the platform actuator being operable to cause successive relative rotational movements of both the manipulator and the platform about the wheeled chassis for providing access for loading or unloading each subsequent article in the plurality of articles.

The manipulator may be coupled to the wheeled chassis via a support and the base actuator may be operably configured to cause rotary movement of the support about the wheeled chassis.

The wheeled chassis may include at least one drive for driving wheels of the wheeled chassis and may further include a controller operably configured to cause the at least one drive to orient the wheeled chassis for movement in a direction aligned to pick up or place the plurality of articles in a line, cause the base actuator to cause rotary movement of the manipulator about the wheeled chassis to orient the manipulator for loading or unloading the plurality of articles, and cause the platform actuator to cause rotary movement of the platform to after loading each article, dispose an empty location on the platform in reach of the manipulator for loading a subsequent article, or dispose a subsequent article on the platform in reach of the manipulator for unloading.

The wheeled chassis may include a drive for driving at least one wheel of the wheeled chassis and may further include a controller operably configured to control the drive to orient the wheeled chassis to align the manipulator for loading or unloading each of the first article and the subsequent articles.

The manipulator may include a pair of outwardly directed spaced apart arms operably configured to grasp the article, an arm actuator, operably configured to vertically rotate the arms toward the platform while the article is suspended between the arms, and an end effector distally disposed on each respective arm and the end effectors may be operably configured to grasp the article and suspend the article during vertical movement of the arms.

The arms may be mounted for vertical rotation on a driven shaft and the end effectors may be coupled to the shaft via a belt such that rotation of the arms causes a respective rotation of the end effectors for maintaining an orientation of the end effectors while grasping the article.

The arms may be mounted for one of lateral movement and rotational movement about a pivot to cause the pair of end effectors to move to grasp or release the article.

The apparatus may include at least one tool operably configured to perform an operation on the articles while transporting the plurality of articles on the wheeled chassis.

The at least one tool may be coupled to the manipulator such that causing rotary movement between the manipulator and the platform provides access to each article for performing the operation.

The manipulator and the at least one tool may be respectively coupled to a common base mounted for rotation on the wheeled chassis such that rotary movement of the common base causes rotary movement of each of the manipulator and the at least one tool.

The at least one tool may be coupled to the wheeled chassis such that causing rotary movement between the wheeled chassis and the platform provides access to each article for performing the operation.

The platform may include a plurality of article supports for receiving and supporting the article.

In accordance with another disclosed aspect there is provided a method of transporting a plurality of articles on a wheeled chassis. The method involves causing a manipulator coupled to the wheeled chassis to load a first article of the plurality of articles at a first position on a platform disposed on the wheeled chassis, or unload the first article of the plurality of articles from the first position on the platform. The method also involves causing successive relative rotational movements between the manipulator and the platform to provide access to successive rotationally spaced apart positions on the platform, and causing the manipulator to load or unload each subsequent article of the plurality of articles to or from the successive rotationally spaced apart positions on the platform.

Causing successive relative rotational movements may involve one of causing rotary movement of the platform about the wheeled chassis and causing rotary movement of the manipulator about the wheeled chassis.

Causing successive relative rotational movements may involve causing rotary movement of both the manipulator and the platform about the wheeled chassis.

Causing rotary movement of both the manipulator and the platform about the wheeled chassis may involve causing the wheeled chassis to be aligned for movement in a direction aligned to pick up or place the plurality of articles along a line, causing rotary movement of the manipulator to orient the manipulator for loading or unloading the plurality of articles, and causing rotary movement of the platform to, after loading each article, dispose an empty location on the platform in reach of the manipulator for loading a subsequent article, or dispose a subsequent article on the platform in reach of the manipulator for unloading.

The method may involve controlling a drive associated with at least one wheel of the wheeled chassis to orient the wheeled chassis to align the manipulator for loading each of the first article and the subsequent articles.

The method may involve operating at least one tool to perform an operation on the articles while transporting the plurality of articles on the wheeled chassis.

Operating the at least one tool may involve causing rotational movement between the at least one tool and the platform to provide access to each article for performing the operation.

Causing rotational movement between the at least one tool and the platform may involve causing rotational movement of the manipulator, the at least one tool being coupled to the manipulator.

In accordance with another disclosed aspect there is provided a method for transporting a plurality of articles between a pickup location and an intended drop-off location on a wheeled chassis having a pair of transceivers disposed in spaced apart relation on the wheeled chassis. The method involves positioning a pickup beacon proximate the plurality of articles at the pickup location, positioning a left drop-off beacon and a right drop-off beacon on either side of the intended drop-off location, the left and right drop-off beacons indicating a desired alignment of the plurality of articles at the respective location, receiving location signals at transceivers disposed on each of the beacons and at the pair of transceivers on the wheeled chassis, processing the location signals to determine a location and orientation of the wheeled chassis with respect to the beacons, navigating the wheeled chassis using the determined location and orientation of the wheeled chassis to pick up successive articles of the plurality of articles proximate the pickup location, move between the pickup location and the drop-off location, and place articles proximate the drop-off location.

Receiving location signals may involve transmitting ultra-wideband (UWB) signals at the transceivers disposed on each of the beacons and at the pair of transceivers on the wheeled chassis, and receiving the UWB signals at the other transceivers disposed on each of the beacons and at the pair of transceivers on the wheeled chassis.

Navigating may involve using the location signals to determine a real-time location and orientation for steering the wheeled chassis along a path between the pickup location and drop-off location, receiving proximity signals indicative of obstacles in the path of the wheeled chassis, and using the received proximity signals and location signals to modify the path of the wheeled chassis to avoid detected obstacles.

Receiving the proximity signals may involve generating proximity signals using at least one of an optical sensor, an infrared sensor, light detection and ranging (LIDAR) sensor, and an ultrasonic sensor.

Receiving the proximity signals may involve receiving a first proximity signal from an infrared sensor operably configured to indicate close range obstacles, and a second proximity signal from a light detection and ranging (LIDAR) sensor indicating mid and far range obstacles.

The method of may further involve, when the path of the wheeled chassis is within a pre-determined range of the pickup location, processing the received proximity signals to determine whether obstacles in the path of the wheeled chassis correspond to any of the plurality of articles to be transported, and in response causing the wheeled chassis to steer towards one of the articles in the plurality of articles.

The method of may further involve, when path of the wheeled chassis is within a pre-determined range of the drop-off location, causing the wheeled chassis to steer to a first location defined with respect to one of the left drop-off beacon and a right drop-off beacon for unloading of a first article.

The method may involve causing the wheeled chassis to steer to successive locations defined with respect to the one of the left drop-off beacon and a right drop-off beacon for unloading of a second article and subsequent articles in the plurality of articles.

In accordance with another disclosed aspect there is provided a system for transporting a plurality of articles between a pickup location and an intended drop-off location. The system includes a wheeled chassis having a pair of transceivers disposed in spaced apart relation on the wheeled chassis, a pickup beacon positioned proximate the plurality of articles at the pickup location, a left drop-off beacon and a right drop-off beacon positioned on either side of the intended drop-off location. The left and right drop-off beacons indicate a desired alignment of the plurality of articles at the respective location, each beacon including a transceiver. The transceivers on the beacons and the pair of transceivers on the wheeled chassis are operably configured to receive location signals and process the location signals to determine a location and orientation of the wheeled chassis with respect to the beacons for navigating the wheeled chassis to pick up articles in the plurality of articles proximate the pickup location, to move between the pickup location and the drop-off location, and to place articles in the plurality of articles proximate the drop-off location.

The transceivers disposed on each beacon and the pair of transceivers on the wheeled chassis may include ultra-wideband (UWB) transceivers.

The system may include at least one proximity sensor disposed on the wheeled chassis, the proximity sensor being operable to provide an indication of obstacles in the path of the wheeled chassis.

The platform may include a plurality of article supports for receiving and supporting the article and the method may involve causing the manipulator to load or unload the first article from a first article support.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
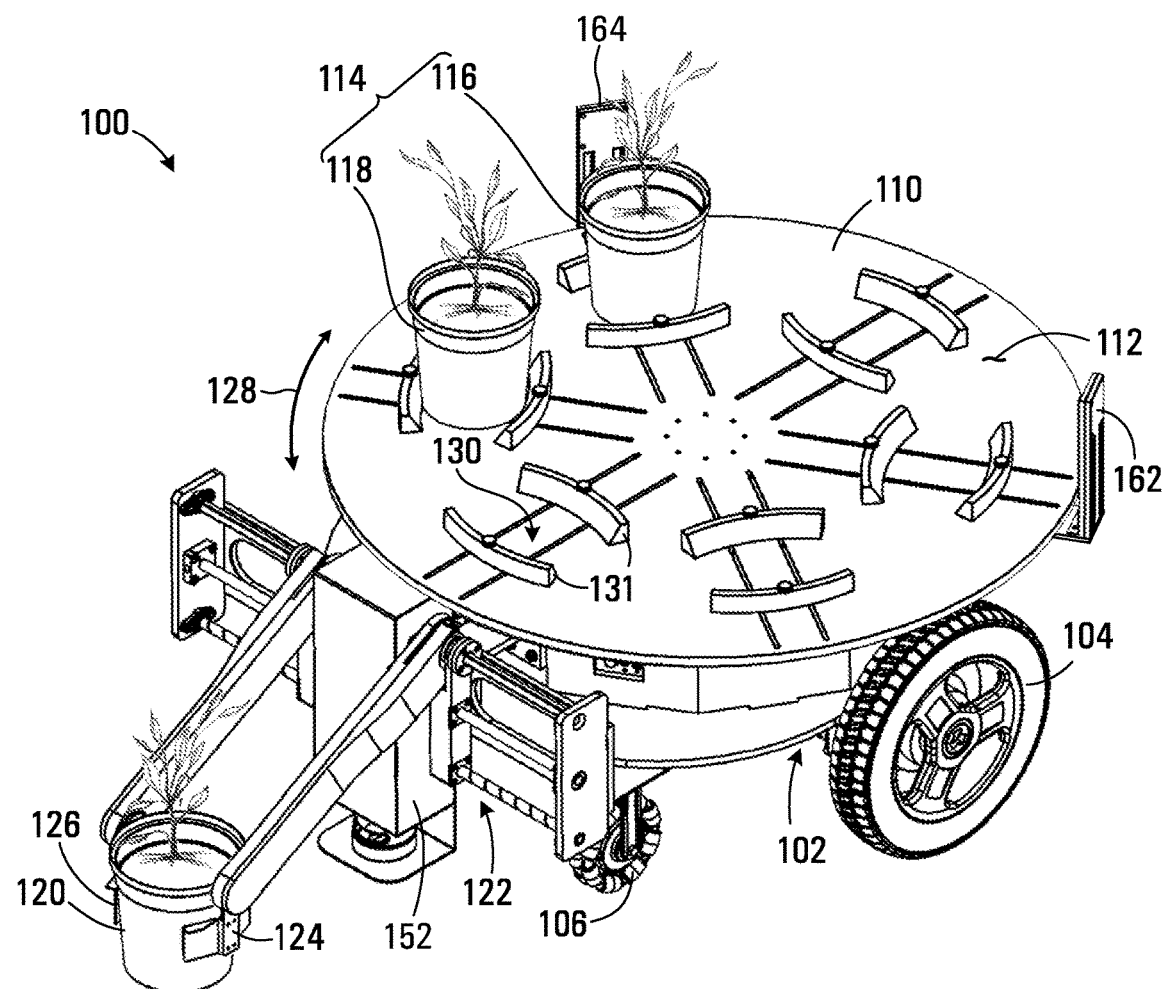
FIG. 1 is a perspective view of an apparatus for transporting a plurality of articles according to a first disclosed embodiment.

Referring to FIG. 1, an apparatus for transporting a plurality of articles according to a first disclosed embodiment is shown generally at 100. The apparatus 100 includes a wheeled chassis 102. In the embodiment shown, the wheeled chassis 102 includes a pair of drive wheels 104, a pair of front castor wheels 106 (only one of each of the pairs of wheels is visible in FIG. 1), and a further rear castor wheel (not visible in FIG. 1 but shown at 108 in FIG. 2). The castor wheels 106 and 108 are able to swivel to permit the wheeled chassis 102 to move in a direction determined by the drive provided to the pair of drive wheels 104. The wheeled chassis 102 has a rounded shape, but in other embodiments may be otherwise shaped.

The apparatus 100 also includes a platform 110 disposed on the wheeled chassis 102. The platform 110 has an upper surface 112 for receiving a plurality of articles 114 to be transported. In FIG. 1, two articles 116 and 118 of a plurality of articles 114 have been received on the platform 110 and a third article 120 is about to be loaded onto the platform 110. The apparatus 100 also includes a manipulator 122 coupled to the wheeled chassis 102. The manipulator 122 has a pair of end effectors 124 and 126 for grasping the article 120. The movements of the end effectors 124 and 126 are actuated by actuators housed in an actuator housing 152. In other applications, the pair of end effectors 124 and 126 may be otherwise configured in accordance with the articles to be loaded and unloaded.

In operation, the apparatus 100 is configured to permit successive relative rotational movements between the manipulator 122 and the platform 110 in a direction indicated by the arrow 128. The successive relative rotational movements provide access for loading each subsequent article in the plurality of articles 114 onto the platform 110 at successive rotationally spaced apart positions. For example, as shown in FIG. 1, the platform 110 has been positioned to permit access to a position 130 for receiving the article 120. The platform 110 may have a pair of article supports 131 at each position such as shown for the position 130 in FIG. 1.

In the embodiment shown the plurality of articles 114 are plant pots and the apparatus 100 may be used in a plant nursery. Another application of the apparatus 100 may involve transporting blood samples from one location to another within a health care facility.

Figure 2:
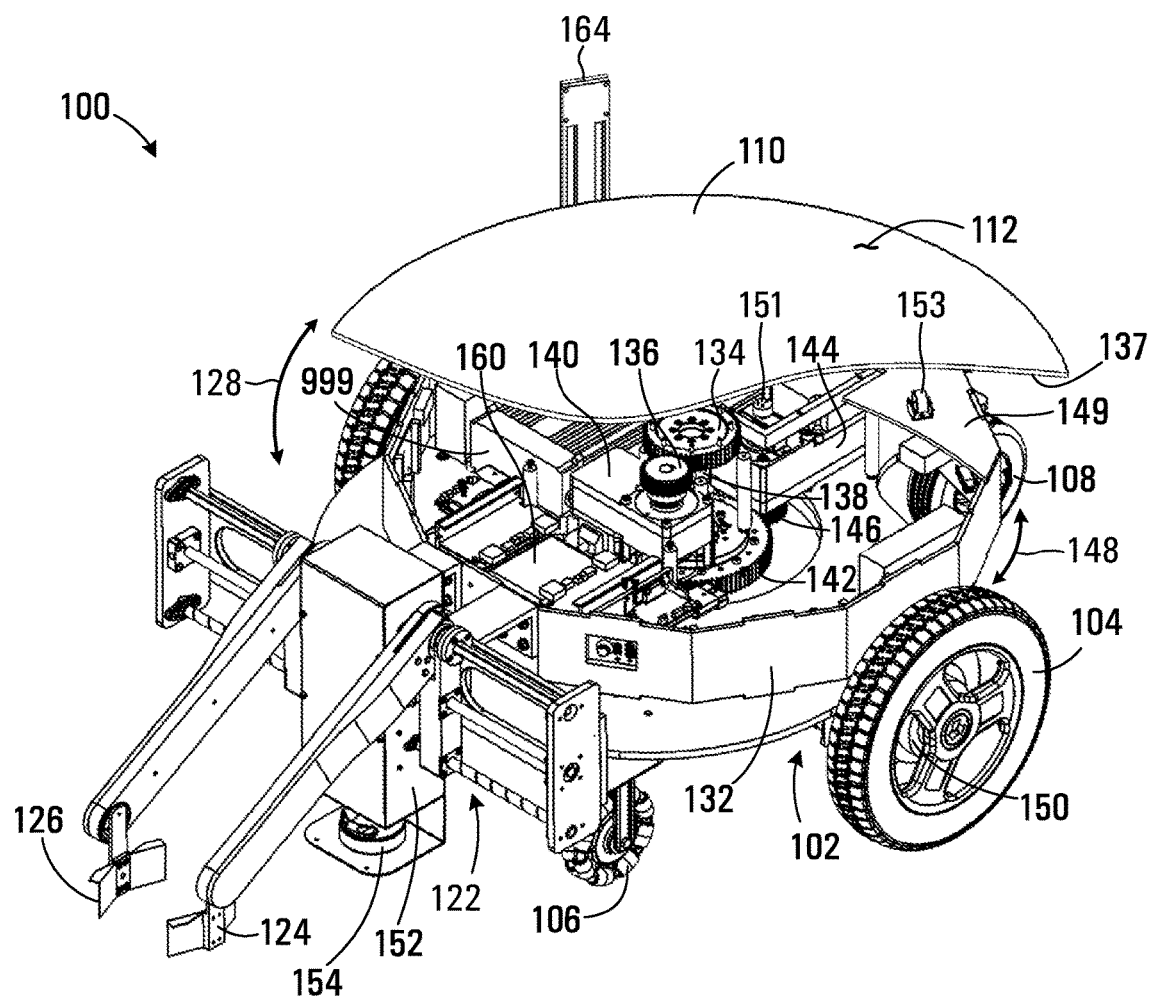
FIG. 2 is a cut-away perspective view of the apparatus shown in FIG. 1.

The apparatus 100 is shown with the platform 110 partially cut away in FIG. 2. Referring to FIG. 2, in this embodiment the apparatus 100 includes a base 132 coupled to the wheeled chassis. The platform 110 includes a gear 134 coupled to an underside 137 of the platform 110. The gear 134 and platform are mounted via a shaft 138 to the base 132. The apparatus 100 also includes a platform actuator 140 for providing a rotation torque to a drive gear 136 that meshes with the gear 134. The platform actuator 140 includes a rotational encoder (not shown) that measures the angular rotation of the platform 110. In this embodiment the platform actuator 140 is implemented using an electrical motor that generates a torque for causing rotational movement of the drive gear 136, which in turn causes the gear 134 and the platform 110 to rotate about the shaft 138 in the direction 128 with respect to the base 132.

In the embodiment shown, the base 132 is also rotatable with respect to the wheeled chassis 102 and includes a gear 142 coupled to the wheeled chassis. The base 132 includes a base actuator 144 having a drive gear 146 that engages with the gear 142. In this embodiment the base actuator 144 is implemented using an electrical motor that generates a torque for causing rotational movement of the drive gear 146, which causes the base 132 to rotate about the gear 142, and thus the wheeled chassis 102, in a direction indicated by the arrow 148. The base actuator 144 is mounted to a cover plate 149 (shown partially cut away in FIG. 2) that covers the base 132. The base actuator 144 includes a rotational encoder 151 for measuring the angular rotation of the base 132. The cover plate 149, which is shown cut away in FIG. 2, extends across and covers the base 132 and carries a plurality of rollers (of which a roller 153 is shown in FIG. 2). The rollers are distributed peripherally on the cover plate and support the underside 137 platform 110 during loading, transporting, and unloading operations.

In this embodiment, the manipulator 122 is coupled to and moves with the base 132. Since the platform 110 is also coupled to the base 132, the platform will move in the direction 148 when the base moves and relative rotational movements of the platform 110 with respect to the base are actuated by causing the platform actuator 140 to drive the drive gear 136.

In other embodiments the platform 110 and base 132 may be independently rotatable relative to the wheeled chassis 102. Alternatively, in some embodiments the base 132 may be fixed to the wheeled chassis and not able to rotate independently of the wheeled chassis 102.

In the embodiment shown in FIG. 1 and FIG. 2 both of the pair of the wheels 104 are independently driven by a hub drive 150. The front castor wheels 106 and rear castor wheel 108 are not driven but rather provide stability for the wheeled chassis 102. In other embodiments the pair of driven wheels 104 may have a common drive and one of the castor wheels 106 and 108 may be steerable.

The apparatus 100 also includes a proximity sensor 154, which is operable to provide an indication of obstacles in the path of the wheeled chassis 102. In the embodiment shown the proximity sensor 154 is implemented using an optical light detection and ranging (LIDAR) sensor. Other proximity sensors such as an infrared sensor or ultrasonic sensor may be alternatively or additionally used to implement the proximity sensor 154.

Figure 3:
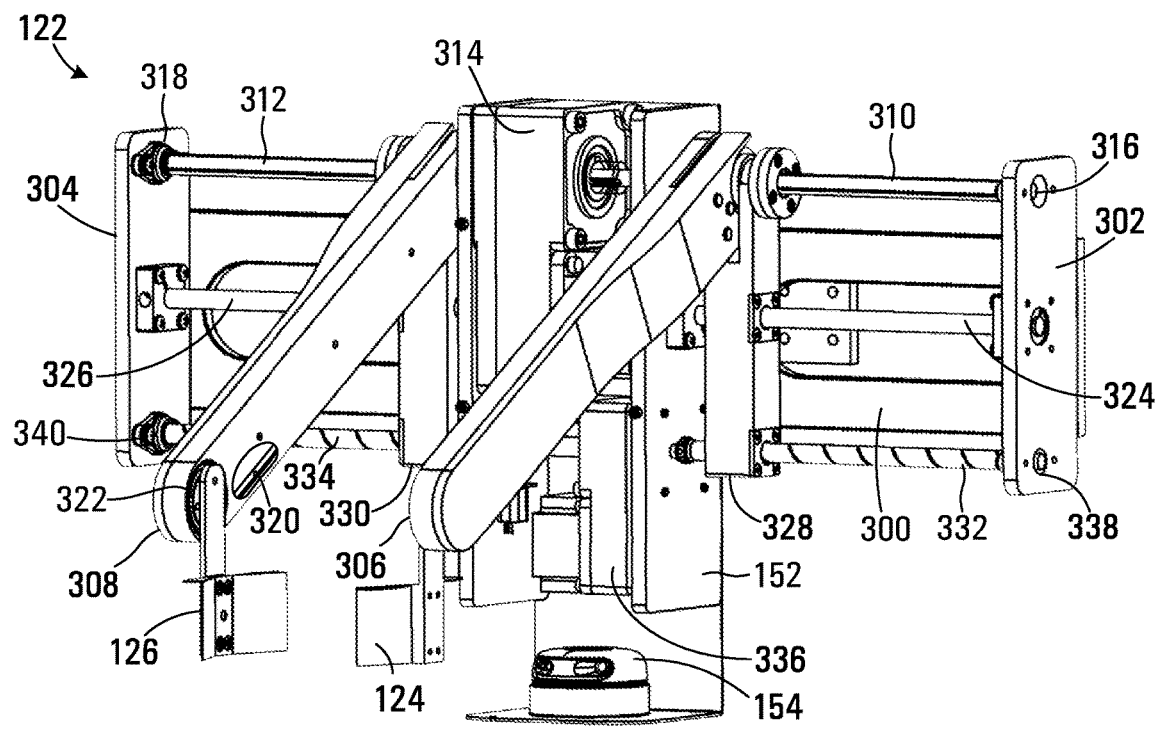
FIG. 3 is a perspective view of a manipulator of the apparatus shown in FIG. 1.

The manipulator 122 is shown in isolation in FIG. 3 with a cover (shown in FIG. 2) of the actuator housing 152 removed to reveal details of actuators for activating movements of the manipulator. Referring to FIG. 3, the manipulator 122 includes a frame 300, a pair of endplates 302 and 304. In the embodiment shown, the end effectors 124 and 126 are coupled to respective arms 306 and 308. Each arm 306 and 308 is mounted for rotation on a respective spline shaft 310 and 312. The manipulator 122 also includes an arm actuator 314, which is coupled to the respective spline shafts 310 and 312. The spline shaft 310 extends between a bearing 316 mounted on the endplate 302 and the actuator housing 152 and is coupled to the arm actuator 314. Similarly, the spline shaft 312 extends between a bearing 318 mounted on the endplate 304 and the actuator housing 152 and is also coupled to the arm actuator 314.

The arm actuator 314 is operable to generate a rotational torque on the spline shafts 310 and 312 for causing the arms 306 and 308 to be rotated about the shafts for raising or lowering the respective end effectors 124 and 126. The arm actuator 314 includes an encoder (not shown) that provides a measurement of the rotational position of the spline shafts 310 and 312 and thus the arms 306 and 308. In the embodiment shown, the end effectors 124 and 126 are mounted on a pulley belt 320, which is coupled to between a pulley wheel on the spline shaft 312 (not shown) and a pulley wheel 322. When the pulley wheel on the spline shaft 312 rotates, the pulley belt 320 causes a corresponding synchronous rotation of the pulley wheel 322 such that the end effector 126 remains in the orientation shown (i.e. generally vertically oriented) when the arm 308 is raised or lowered. The arm 306 is similarly configured.

The manipulator 122 also includes a guide rod 324 extending between the endplate 302 and the actuator housing 152 and a guide rod 326 extending between the endplate 304 and the actuator housing. The arms 306 and 308 are coupled to respective linear guides 328 and 330 that are received on the respective guide rods 324 and 326. The linear guides 328 and 330 facilitate translational movements of the arms 306 and 308 along the respective guide rods 324 and 326. The manipulator 122 further includes a leadscrew 332, a leadscrew 334, and a translation actuator 336. The leadscrew 332 extends between a bearing 338 mounted on the endplate 302 and the actuator housing 152 and is coupled to the translation actuator 336. Similarly, the leadscrew 334 extends between a bearing 340 mounted on the endplate 304 and the actuator housing 152 and is coupled to the translation actuator 336. Each linear guide 328 and 330 has a leadscrew nut (only the leadscrew nut 342 associated with the guide 328 is visible in FIG. 3), which is received on the respective leadscrews for causing translational movement of the linear guides to reduce or increase a lateral distance between the pair of end effectors 124 and 126 for accommodating different sized articles. In this embodiment the leadscrew 332 and leadscrew 334 have opposite thread directions, such that rotation of the respective leadscrews by the translation actuator 336 causes opposite movements of the respective linear guides 328 and 330 along the guide rods 324 and 326. The translation actuator 336 includes a rotary encoder (not shown) that provides a measurement of the rotational drive provided to the leadscrews 332 and 334, which is converted into a linear translation distance based on the leadscrew thread pitch.

Figure 4:
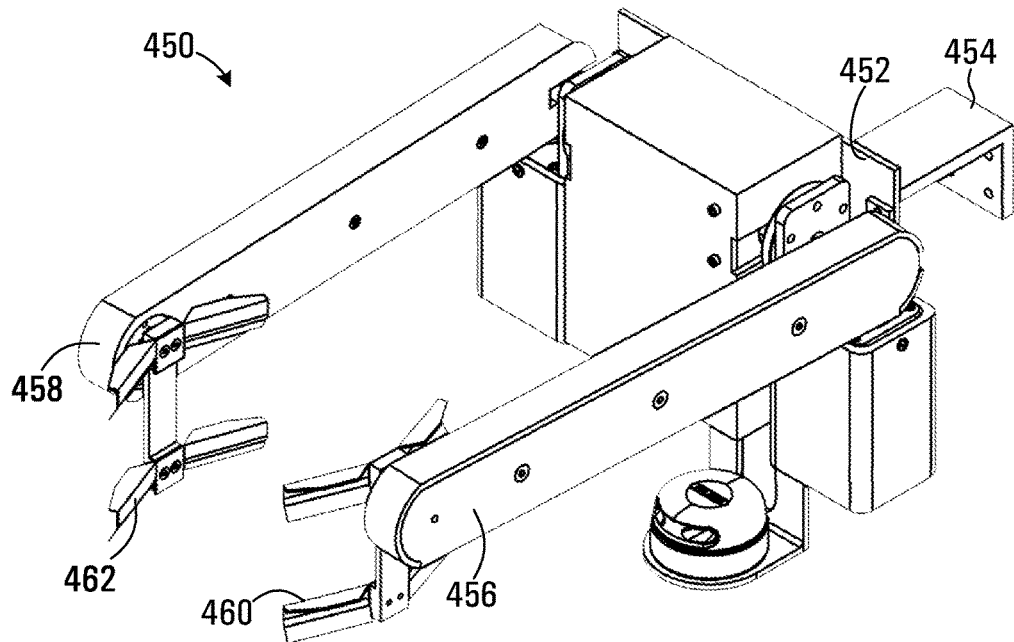
FIG. 4 is a perspective view of an alternative manipulator embodiment for the apparatus shown in FIG. 1.
Figure 5:
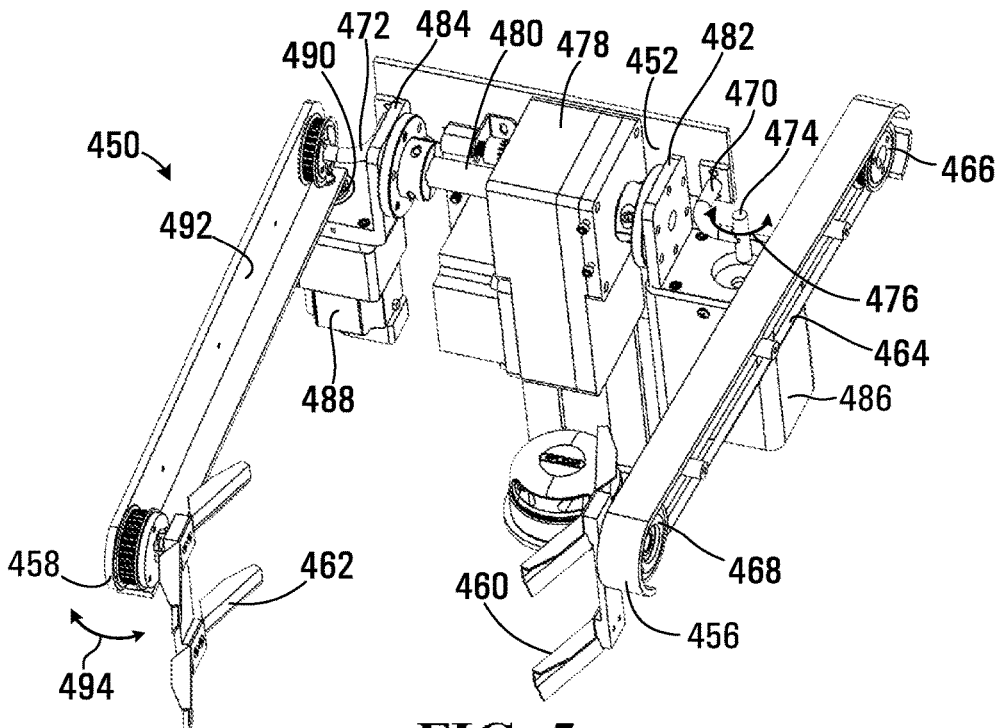
FIG. 5 is a partially exploded perspective view of the manipulator shown in FIG. 4.

An alternative manipulator embodiment is shown in FIG. 4 at 450. Referring to FIG. 4, the manipulator 450 includes a frame 452, which attaches to the apparatus 100 via a bracket 454. The manipulator 450 includes a pair of arms 456 and 458 having respective end effectors 460 and 462. Further details of the manipulator 450 are shown in the partially exploded view of FIG. 5. Referring to FIG. 5, the arms 456 and 458 are similarly configured to the arms 306 and 308 shown in FIG. 3, and include a pulley belt 464 coupled to between pulley wheels 466 and 468 for providing synchronous rotation such that the end effectors 460 and 462 maintain their orientation when the arms are raised or lowered.

The manipulator 450 includes pivots 470 and 472 mounted on the frame 452 for pivotably mounting each of the arms 456 and 458. In FIG. 5, the arm 456 is shown removed from the pivot 470 to better show details of the manipulator 450. The pivot 470 has a vertically extending portion 474 for engaging a channel (not shown) in the pulley wheel 466 such that the pulley wheel is able to rotate freely about the vertically extending portion of the pivot in a direction indicated by the arrow 476. The manipulator 450 also includes an arm actuator 478 operable to raise or lower the arms 456 and 458 by causing rotation of a shaft 480, which is coupled to arm mounting brackets 482 and 484. When the shaft 480 causes the arm 456 to be raised or lowered, the vertically extending portion 474 of the pivot 470 prevents the pulley 466 from rotating and the pulley belt 464 is moved causing a rotational movement to the pulley wheel 468 in proportion to the upward or downward movement of the arm. In this manner, the end effector 460 remains oriented as shown in FIG. 4 when the arm is raised or lowered. The arm 458 is configured in the same way.

The manipulator 450 also includes respective stepper motors 486 and 488 for causing lateral rotation of the respective arms 456 and 458. The stepper motor 488 associated with the arm 458 is shown with an outer covering removed in FIG. 5. The stepper motor is coupled via a drive shaft 490 to a beam 492 of the arm 458 and causes lateral rotation of the beam and arm about the drive shaft in a direction shown by the arrow 494.

The manipulator 450 thus differs from the manipulator 122 in that the arms 456 and 458 are configured for a "pincer" type movement for gripping and releasing articles rather than for a lateral translation as in the case of the arms 306 and 308.

Figure 6:
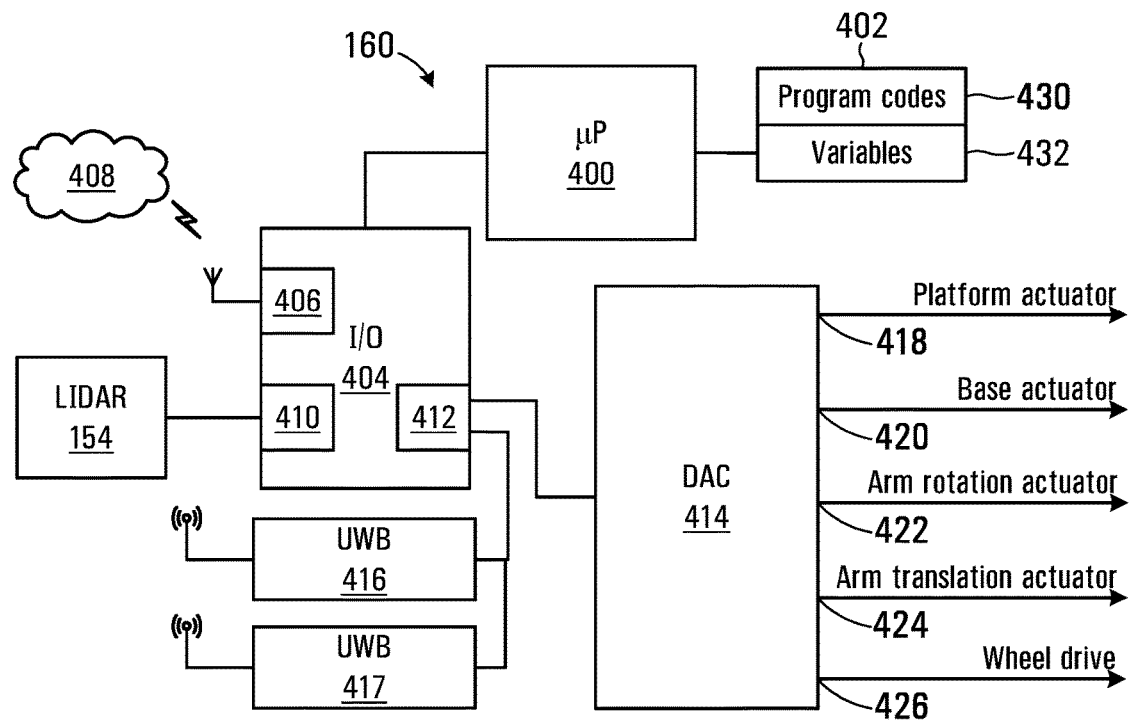
FIG. 6 is a block diagram of a processor circuit for implementing an on-board controller of the apparatus shown in FIG. 1.

Referring back to FIG. 2, in the embodiment shown the apparatus 100 further includes an on-board controller 160 for autonomously controlling operations of the apparatus. The controller 160 is shown in more detail in FIG. 6 and may be implemented using an embedded processor circuit such as a Microsoft Windows® industrial PC. Referring to FIG. 6, the controller 160 includes a microprocessor 400, a memory 402, and an input output (I/O) 404, all of which are in communication with the microprocessor 400. The I/O 404 includes a wireless interface 406 (such as an IEEE 802.11 interface) for wirelessly receiving and transmitting data communication signals between the controller 160 and a network 408. The I/O 404 also includes a wired network interface 410 (such as an Ethernet interface) for connecting to the LIDAR proximity sensor 154. The I/O 404 further includes a USB interface 412 for connecting to a digital to analog converter (DAC) 414 and to ultra-wideband transceivers (UWB) 416 and 417.

The DAC 414 includes a plurality of ports for receiving analog signals and converting the analog signals into digital data representing the signals and/or producing analog control signals. In the embodiment shown the DAC 414 includes a port 418 for producing control signals for controlling the platform actuator 140. The rotary encoder of the platform actuator 140 produces a signal indicating a rotational position of the platform 110, which are received at the port 418. The DAC 414 also includes a port 420 for producing control signals for controlling the base actuator 144. The rotational encoder 151 of the base actuator 144 produces a signal indicating a rotational position of the base 132, which are received at the port 420. The DAC 414 also includes a port 422 for producing control signals for controlling the arm actuator 314 and a port 424 for producing control signals for controlling the translation actuator 336 of the manipulator 122. Signals from the encoders associated with the actuators 314 and 336 are received at the respective ports 422 and 424. The DAC 414 also includes a port 426 for producing control signals for controlling the hub drives 150 of the respective drive wheels 104 for moving and steering the wheeled chassis 102 of the apparatus 100.

Program codes for directing the microprocessor 400 to carry out various functions are stored in a location 430 of the memory 402, which may be implemented as a flash memory, for example. The program codes 430 direct the microprocessor 400 to implement an operating system (such as Microsoft Windows for example) and to perform various other system functions associated with operation of the apparatus 100. The memory 402 also includes variable storage locations 432 for storing variable and parameter data associated with operation of the apparatus 100.

In other embodiments (not shown), the controller 160 may be partly or fully implemented using a hardware logic circuit including discrete logic circuits, an application specific integrated circuit (ASIC), and/or a field-programmable gate array (FPGA), for example.

Figure 7:
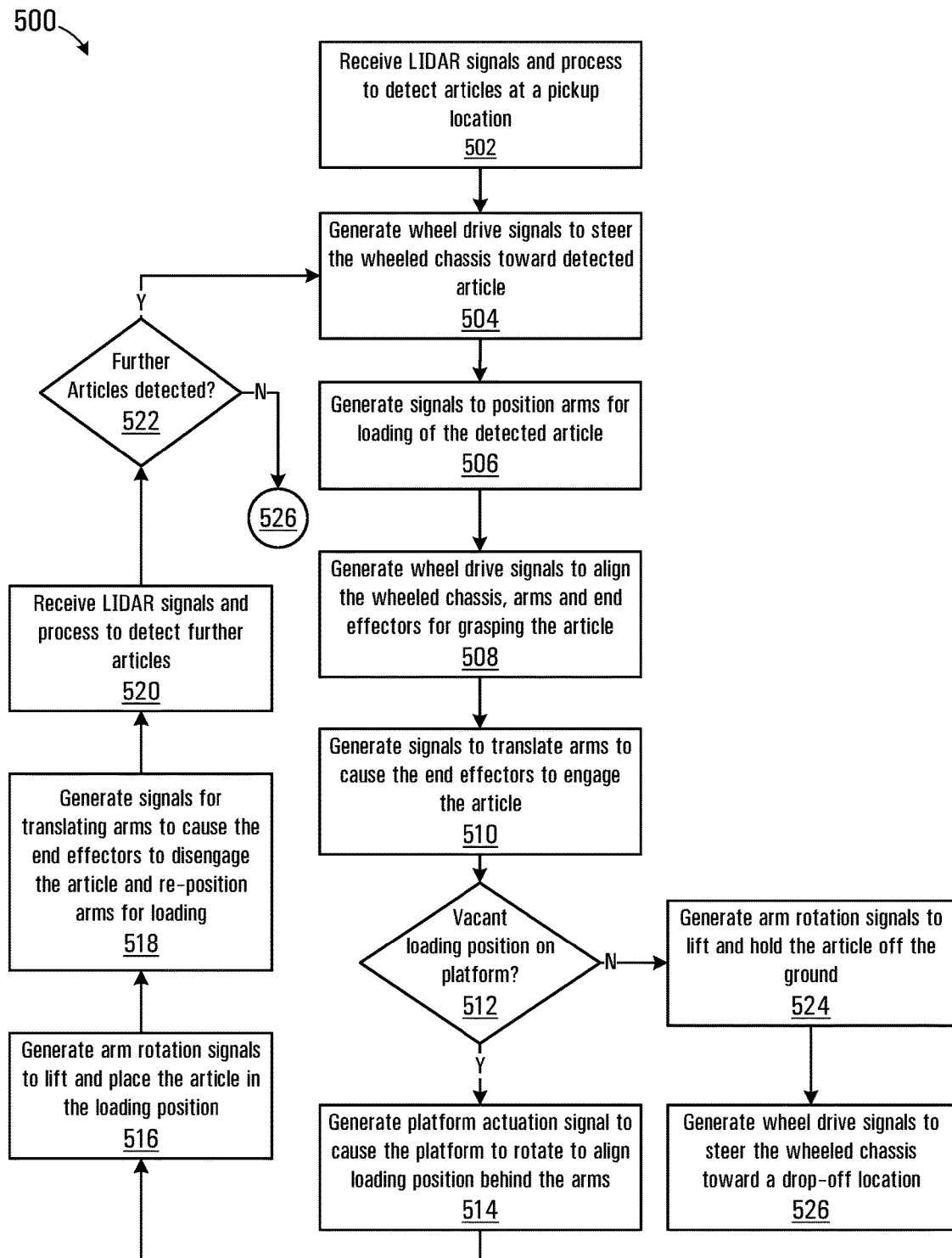
FIG. 7 is a flowchart depicting blocks of code for directing the processor circuit of FIG. 6 to control autonomous loading operations of the apparatus shown in FIG. 1.

Referring to FIG. 7, a flowchart depicting blocks of code for directing the controller processor circuit 160 to control autonomous loading operations of the apparatus 100 is shown at 500. The blocks generally represent codes that may be read from the program codes location 430 of the memory 402 for directing the microprocessor 400 to perform various loading functions. The actual code to implement each block may be written in any suitable program language, such as C, C++, C#, Java, and/or assembly code, for example.

Figure 8A:
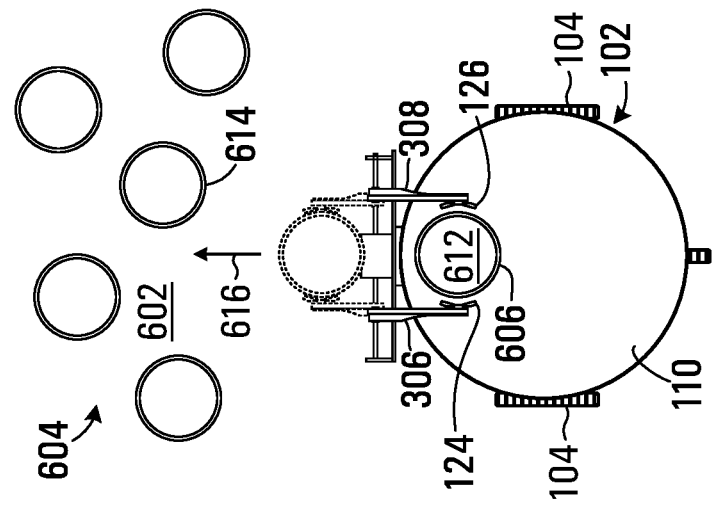
FIG. 8A to 8E are a series of plan views of the apparatus shown in FIG. 1 performing the loading process shown in FIG. 7.

A plan view of the apparatus 100 performing the loading process 500 is provided in FIGS. 8A-8F as an example of a typical loading operation for the apparatus 100. The loading process 500 starts at block 502, which directs the microprocessor 400 to receive signals produced by the LIDAR proximity sensor 154 at the wired network interface 410 of the I/O 404. Referring to FIG. 8A, a plurality of articles to be loaded at a pickup location 602 is shown generally at 604.

The LIDAR proximity sensor 154 is operable to detect articles within a range of angles indicated by broken lines 608 and 610 in FIG. 8A. In one embodiment, standard dimensions for articles to be loaded are stored in the memory 402 (for example a height H and a width W) and block 502 directs the microprocessor 400 read the H and W values and to determine whether the received LIDAR signals include data that corresponds to these dimensions. Articles that generate LIDAR data signals that generally match the standard dimensions are identified as articles to be loaded at the pickup location 602.

Block 504 directs the microprocessor 400 to output signals at the USB interface 412 of the I/O 404, which cause the DAC 414 to generate wheel drive signals at the port 426 for controlling the respective hub drives 150 of the drive wheels 104. The generated drive signals control the respective hub drives 150 for steering the wheeled chassis 102 toward a first detected article 606 of the plurality of articles 604.

Figure 8B:
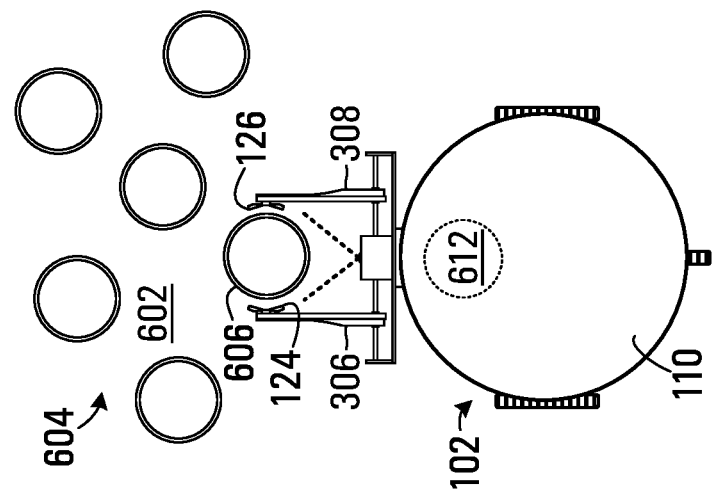

Block 506 then directs the microprocessor 400 to cause the DAC 414 to produce signals at the port 422 for causing the arms 306 and 308 to be positioned for loading by causing the arm translation actuator 336 to translate the arms outwardly to accommodate the width of the detected article. Block 506 also directs the microprocessor 400 to cause the DAC 414 to produce signals at the port 422 for causing the arm rotation actuator 314 rotate the arms 306 and 308 about the spline shafts 310 and 312 until the end effectors 124 and 126 are positioned at height corresponding to the height H of the article 604. Referring to FIG. 8B, in this embodiment the when positioned for loading, the arms 306 and 308 are spaced apart at a distance slightly exceeding the width W of the article 606, either based on the standard dimensions saved in memory 402 or based on a measured dimension of the article from the LIDAR data.

Block 508 then directs the microprocessor 400 to generate wheel drive signals at the port 426 to advance and steer the wheeled chassis 102 to align the arms 306 and 308 such that the respective end effectors 124 and 126 are aligned to grasp the article 606 at diametrically opposing surfaces thereof, as shown in FIG. 8B. Block 510 then directs the microprocessor 400 to cause the DAC 414 to produce signals at the port 422 for causing the arms 306 and 308 to translate inwardly to engage the article 606.

The loading process 500 then continues at block 512, which directs the microprocessor 400 to determine whether there is a vacant loading position available on the platform 110. If there is a vacant loading position available (in the example shown in FIG. 8B the platform is empty), then the microprocessor 400 is directed to block 514. In one embodiment, the number of positions on the platform 110 than can be occupied by articles 604 is determined based on the width W of the articles. A register of the number of positions already filled may also be stored in memory 402, and used by the microprocessor 400 to determine whether there is a vacant position remaining on the platform 110.

Block 514 directs the microprocessor 400 to cause the DAC 414 to generate platform actuation signals at the port 418 for causing the platform 110 to rotate to align a vacant position 612 (shown in broken outline) behind the arms 306 and 308 of the manipulator 122. In the example shown in FIG. 8B, since the platform 110 is empty, no rotational movement of the platform is necessary, but if any articles had already been loaded the platform would need to be rotated to align a vacant position behind the arms 306 and 308 of the manipulator 122.

While blocks 512 and 514 are depicted as following sequentially after blocks 502-510, in practice the functions of these blocks may be performed in parallel with other functions. Similarly, the functions of blocks 506 and 510 may also be performed in parallel with functions 504 and 508.

Block 516 then directs the microprocessor 400 to cause the DAC 414 to generate signals at the port 422 to cause the arm rotation actuator 314 to rotate the arms 306 and 308 upwardly about the spline shafts 310 and 312 towards the platform 110 (as shown in broken outline in FIG. 8C) and over the center toward the vacant position 612 on the platform 110.

Figure 8C:
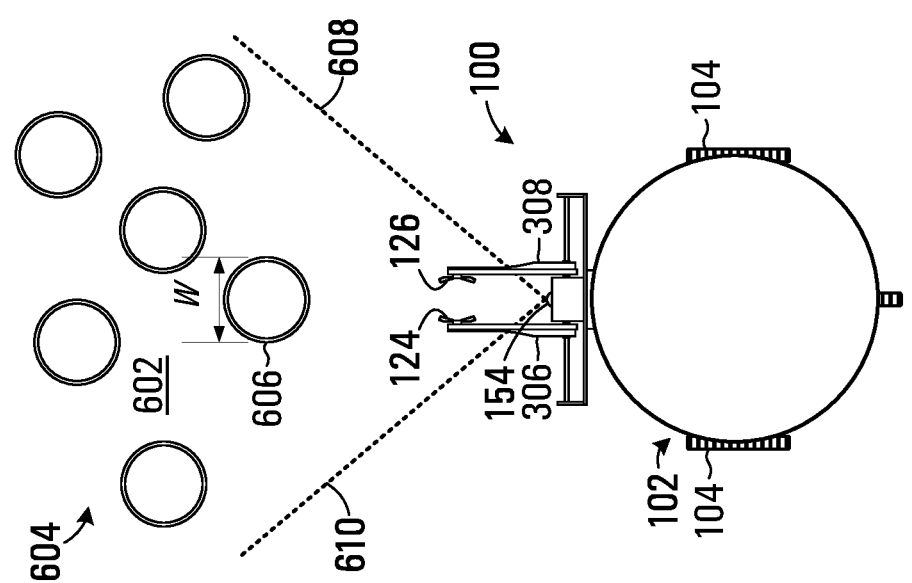

Block 518 then directs the microprocessor 400 to cause the DAC 414 to produce signals at the port 424 for causing the arm translation actuator 336 to translate the arms 306 and 308 outwardly to disengage the article 606, as shown in FIG. 8C. Block 518 also direct the microprocessor 400 to return the arms to the loading position by causing the DAC 414 to output signals for causing the arm actuator 314 to rotate the arms 306 and 308 back to the forward oriented position as shown in FIG. 8B. Block 518 may also cause blocks 512 and 514 to be repeated to cause the platform actuator 140 to rotate the platform 110 to align a vacant position for loading the next article behind the arms 306 and 308 of the manipulator.

The loading process 500 then continues at block 520, which directs the microprocessor 400 to receive signals produced by the LIDAR proximity sensor 154 at the wired network interface 410 of the I/O 404. Block 522 then directs the microprocessor 400 to determine whether further articles are detected, in which case block 522 directs the microprocessor back to block 504 to repeat blocks 504-512. If no further articles are detected, then block 522 directs the microprocessor 400 to block 526, which causes the DAC 414 to generate wheel drive signals at the port 426 for steering the wheeled chassis 102 toward a drop-off location (not shown in FIG. 8).

If at block 512, there is no vacant loading position on the platform 110, the microprocessor 400 is directed to block 524. Block 524 directs the microprocessor 400 to cause the DAC 414 to generate signals at the port 422 for causing the arm actuator 314 to elevate the article 606 off the ground and to hold the article in the arms for transport. Advantageously, even though there are no vacant positions on the platform 110, an additional article may be carried in the pair of end effectors 124 and 126. Block 526 then directs the microprocessor 400 to cause the DAC 414 to generate wheel drive signals at the port 426 for steering the wheeled chassis 102 toward a drop-off location (not shown in FIG. 8).

Figure 9:
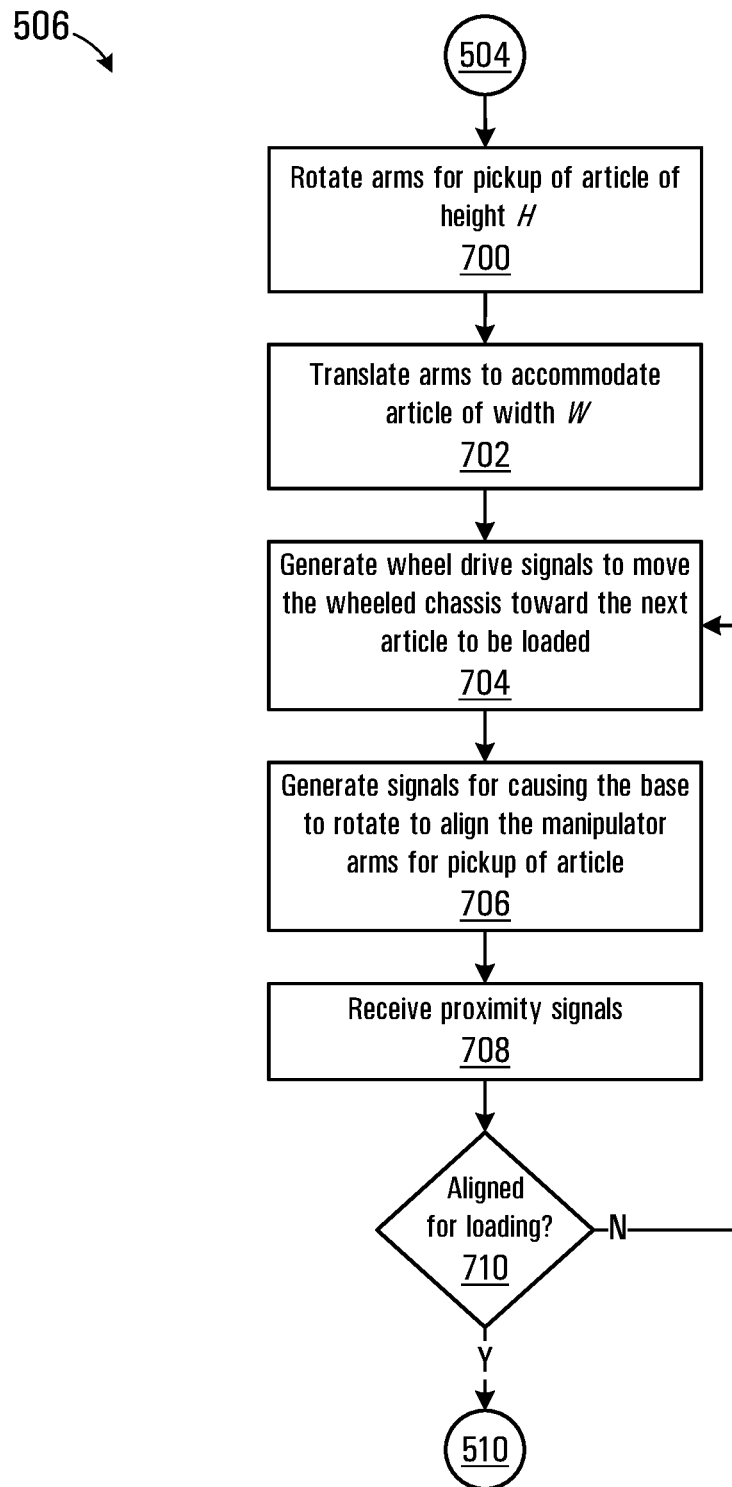
FIG. 9 is an alternative embodiment of a portion of the process shown in FIG. 7.

In the process 500 as described above, the platform actuator 140 positions the platform 110 such that successive vacant loading positions on the platform are disposed to receive articles 604. Additionally or alternatively, the base actuator 144 may be actuated together with the platform actuator 140 at block 506 to facilitate efficient movement of loading of articles. An alternative embodiment of the functions implemented at block 506 is shown in FIG. 9. Referring back to FIG. 8C, following loading of the article 606, the LIDAR proximity sensor 154 may detect an article 614 in the plurality of articles 604 as the next article to be loaded. Referring to FIG. 9, block 700 directs the microprocessor 400 to cause the DAC 414 to generate signals for rotating the arms 306 and 306 to a correct loading height H for picking up the article 614 and block 702 directs the microprocessor 400 to cause the DAC 414 to generate signals for translating the arms 306 and 306 to a correct width W for engaging the article 614.

Block 704 then directs the microprocessor 400 to cause the DAC 414 to generate wheel drive signals at the port 426 to move the wheeled chassis toward the article 614. As shown in FIG. 8C, the wheels remain oriented to move the wheeled chassis 102 in a direction indicated by the arrow 616. Referring to FIG. 8D, and FIG. 9, block 706 then directs the microprocessor 400 to cause the DAC 414 to generate signals at the port 420 for causing the base actuator 144 to rotate the base 132 and the attached manipulator 122 in the direction indicated by the arrow 618. Block 708 then directs the microprocessor 400 to receive proximity signals from the proximity sensor 154 at the wired network interface 410 of the I/O 404. Block 710 then directs the microprocessor 400 to determine whether the apparatus 100 is aligned for loading of the article 614. If at block 710 the apparatus 100 is not yet aligned for loading of the article 614, block 710 directs the microprocessor back to block 704 and blocks 704-708 are repeated to perform further movement iterations until at block 710, it is determined that the apparatus is aligned for loading as shown in FIG. 8D. While blocks 704 and 708 are shown being sequential in FIG. 9, the movement functions could also be performed in parallel. The article 614 is then loaded into a vacant position 620 as described above in connection with blocks 512-520 or blocks 524 and 526. When the platform 110 is rotated to place the vacant position 620 behind the manipulator arms 306 and 308, the rotation of the base 132 is taken into account and the loading operation thus involves coordinated movements of the wheeled chassis 102, base 132, and platform 110. Block 710 then directs the microprocessor 400 to block 510 of the process 500, where the microprocessor is directed to cause the DAC 414 to produce signals at the port 422 for causing the arms 306 and 308 to translate inwardly to engage the article.

Figure 8E:
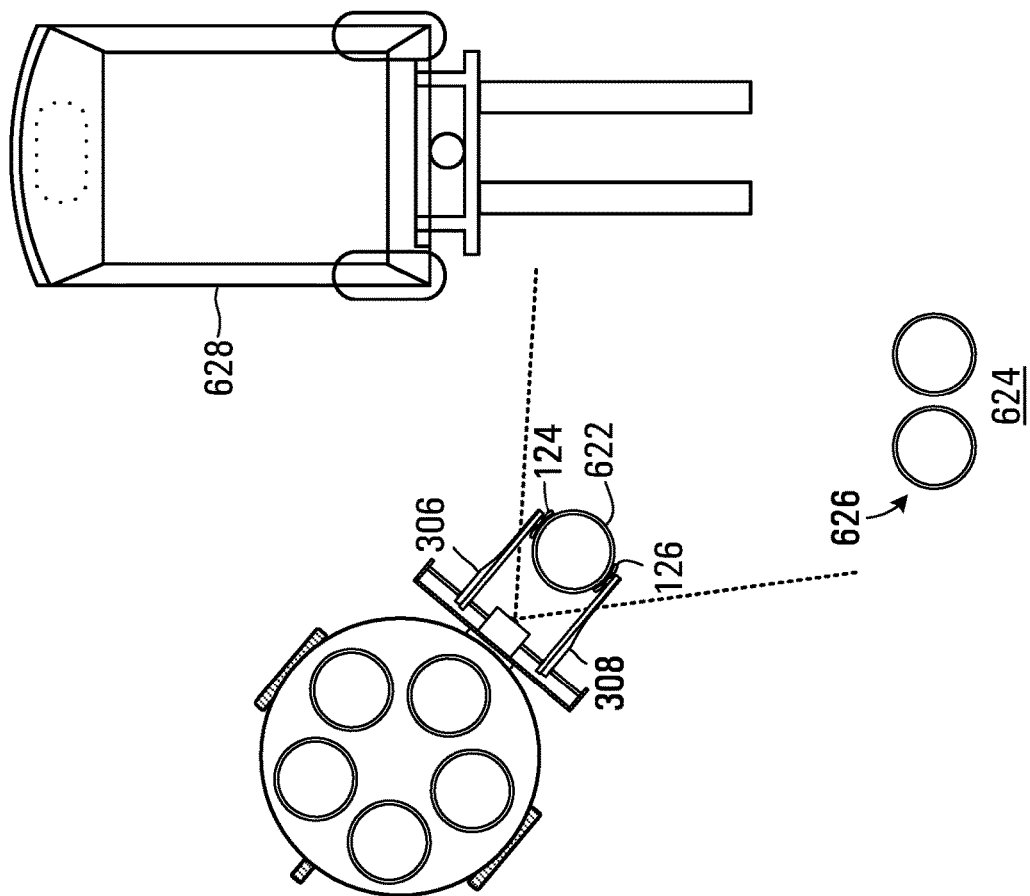
Figure 8D:
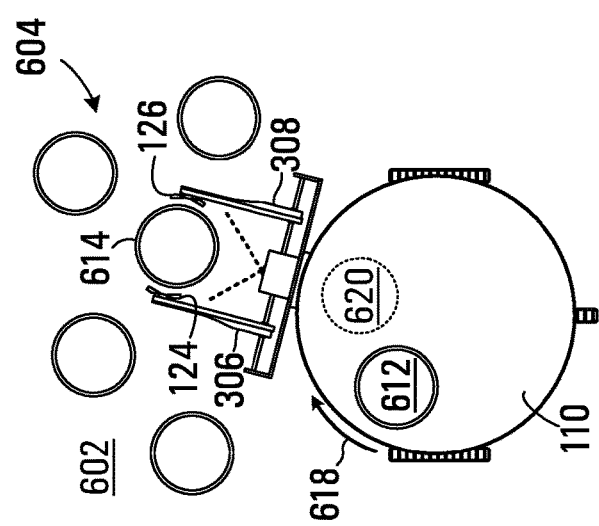

Referring to FIG. 8E, on completion of the process loading process 500, the platform 110 has 5 of the plurality of articles 604 loaded on the platform 110 and a sixth article 622 held for transport in end effectors 124 and 126. As described above, block 526 directs the microprocessor 400 to generate wheel drive signals to steer the wheeled chassis toward a drop-off location 624. In the embodiment shown in FIG. 8E, two articles 626 have already been dropped off at the drop-off location 624. The on-board controller 160 monitors signals produced by the LIDAR proximity sensor 154 to avoid colliding with any obstacles, such as a forklift truck 628.

Figure 10:
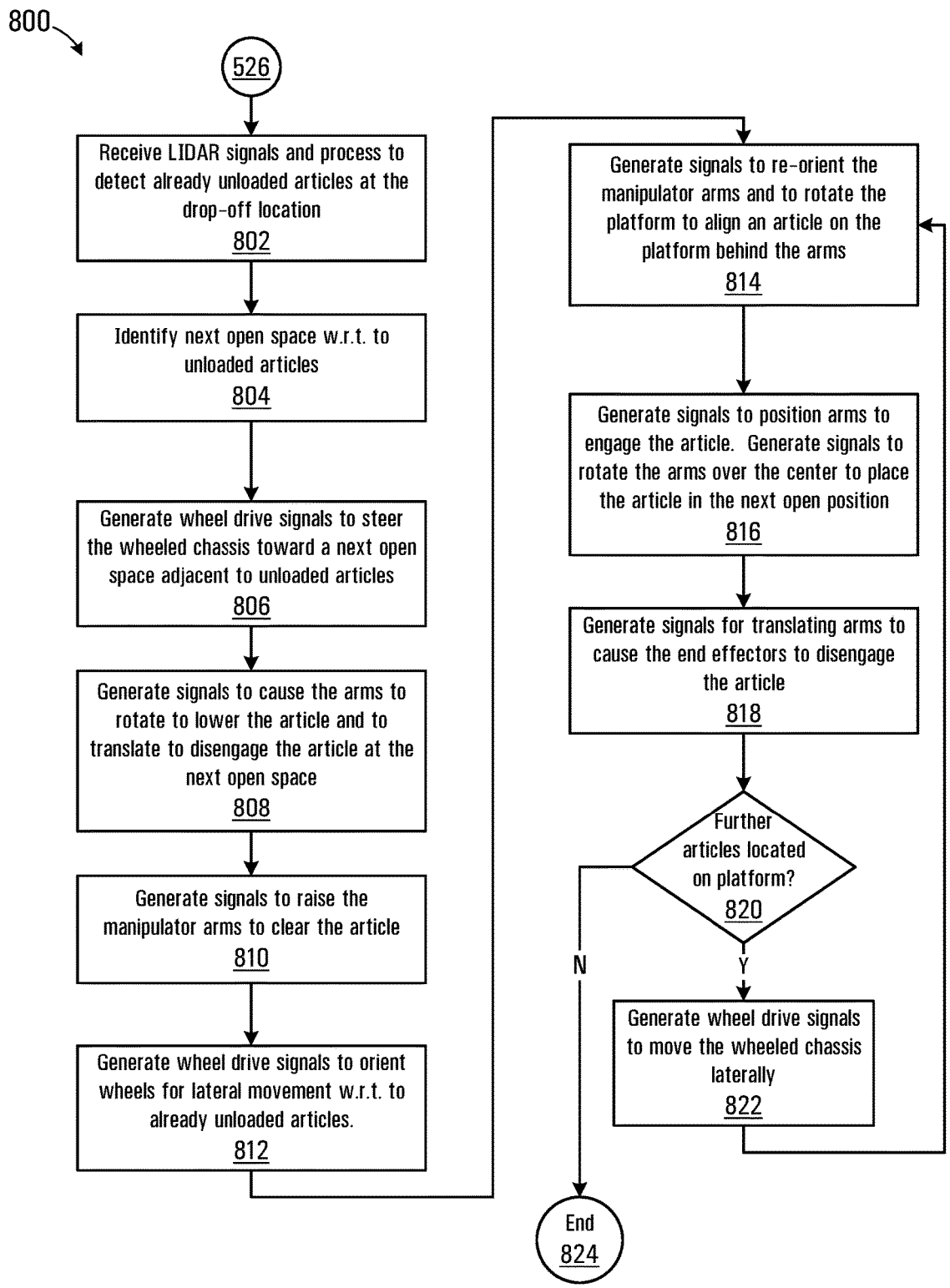
FIG. 10 is a flowchart depicting blocks of code for directing the processor circuit shown in FIG. 6 to control autonomous unloading operations of the apparatus shown in FIG. 1.

Referring to FIG. 10, a flowchart depicting blocks of code for directing the controller processor circuit 160 to control autonomous unloading operations of the apparatus 100 is shown at 800. The process begins at block 802, which directs the microprocessor 400 to receive LIDAR signals from the proximity sensor 154 at the wired network interface 410 of the I/O 404 and to process the signals to detect already unloaded articles at the drop-off location 624.

Figures 11A, 11B, 11C:
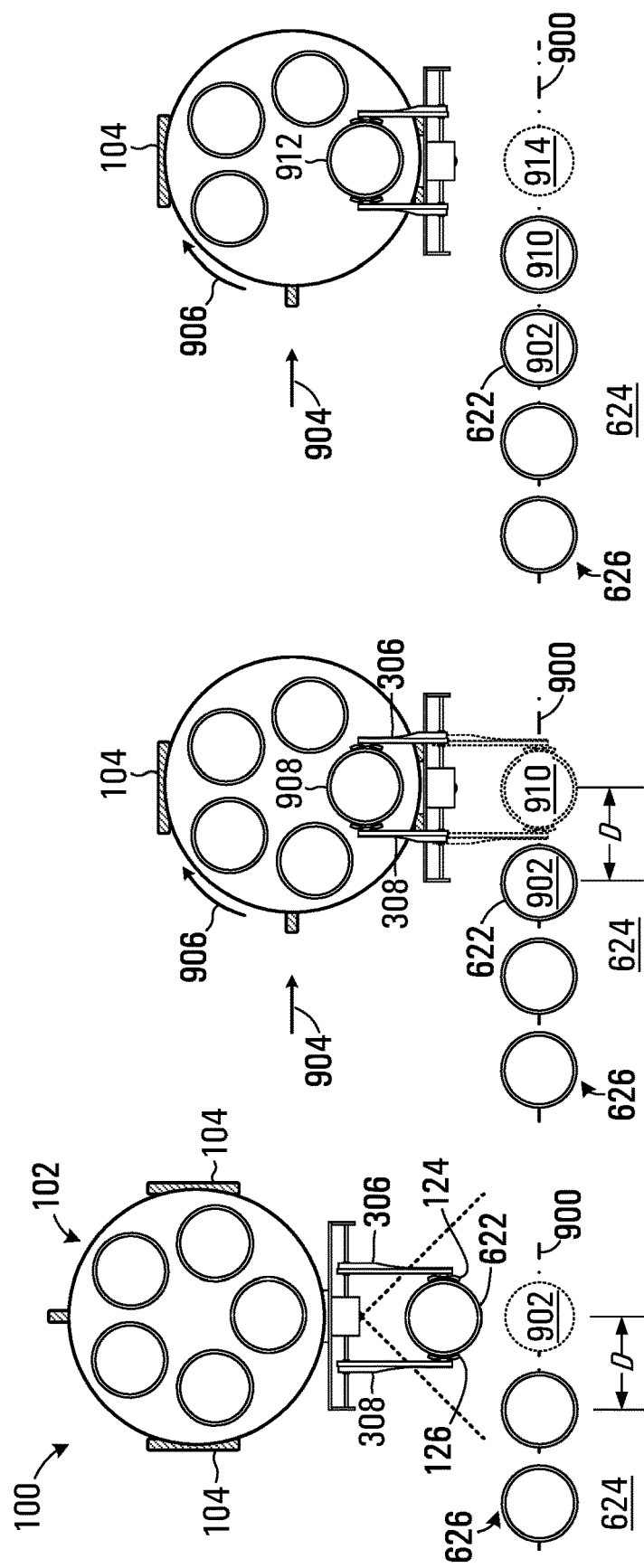
FIG. 11A to 11C are a series of plan views of the apparatus shown in FIG. 1 performing the unloading process shown in FIG. 10.

Two articles 626 have already been unloaded at the drop-off location 624. Block 804 then directs the microprocessor 400 to identify a next open space with respect to the articles 626. Referring to FIG. 11A, in the embodiment shown articles are to be spaced apart by a distance D and aligned along a datum line 900. The distance D may be calculated based on the width W of the articles and such that there remains sufficient space between adjacent articles to permit the end effectors 124 and 126 to be maneuvered. The next open space is identified at 902, and block 806 directs the microprocessor 400 to cause the DAC 414 to generate wheel drive signals at the port 426 to cause the wheeled chassis 102 to move toward the next open space 902 and to position the article 622 (held in the end effectors 124 and 126) above the open space. Block 808 then directs the microprocessor 400 to cause the DAC 414 to generate signals at the port 422 to cause the arms 306 and 308 to rotate to lower the article 622 into the open space 902. Block 808 also directs the microprocessor 400 to cause the DAC 414 to generate signals at the port 424 to translate the arms 306 and 308 outwardly to disengage the article 622.

Block 810 then directs the microprocessor 400 to cause the DAC 414 to generate signals at the port 422 to cause the arms 306 and 308 to be raised to clear the article. Block 812 then directs the microprocessor 400 to cause the DAC 414 to generate wheel drive signals to orient the wheeled chassis 102 for lateral movement in a direction 904 aligned with the datum line 900 along which the already unloaded articles 626 and 622 are aligned. Block 814 then directs the microprocessor 400 to cause the DAC 414 to generate signals at the port 420 to cause the base actuator 144 to rotate the base 132 to re-orient the manipulator 122 toward the articles 626 as shown in FIG. 11B. Block 814 further directs the microprocessor 400 to cause the DAC 414 to generate signals at the port 418 to cause the platform actuator 140 to rotate the platform 110 in a direction indicated by the arrow 906 to align an article 908 on the platform behind the manipulator 122. Block 816 then directs the microprocessor 400 to cause the DAC 414 to produce signals at the port 422 to align the arms 306 and 308 such that the respective end effectors 124 and 126 are aligned to grasp the article 908 at diametrically opposing surfaces thereof, as shown in FIG. 11B. Block 816 also directs the microprocessor 400 to cause the DAC 414 to produce signals at the port 424 to cause the end effectors 124 and 126 to grasp the article 908, and to produce signals at the port 422 to lift the article over the center and lower the article into a next open space 910. Block 818 then directs the microprocessor 400 to cause the DAC 414 to generate signals at the port 424 to translate the arms 306 and 308 outwardly to disengage the article 908. The article 908 is again aligned with the datum line 900 and placed a distance D from the article 622.

The process 800 then continues at block 820, which directs the microprocessor 400 to determine whether there are further articles remaining on the platform to be unloaded. As described above, a register for the number of loaded articles is stored in the memory 402 and is read and updated by the microprocessor each time an article is unloaded from the platform 110. If at block 820 further articles are still to be unloaded, the microprocessor 400 is directed to block 822, which directs the microprocessor to cause the DAC 414 to generate wheel drive signals at the port 426 to cause a further lateral movement corresponding to the distance D in the direction 904 for unloading the next article into an open space 914. Block 822 then directs the microprocessor 400 back to block 814 and blocks 814-820 are repeated for each remaining article on the platform 110.

If at block 820, no further articles remain on the platform, then the unloading process ends at 824. In the embodiment shown, the combination of the rotatable base 132 and rotatable platform 110 advantageously allow orientation of the wheels 104 for movement in the direction 904. Subsequent lateral movements of the wheeled chassis 102 by the distance D facilitate rapid unloading of articles from the platform. In embodiments having a fixed base 132, following placement of the article in the open space 902, each subsequent unload would require a reversing movement of the wheeled chassis 102 to clear the unloaded article followed by a forward movement of the wheeled chassis to align with the next open space.

In the embodiment shown in FIGS. 11A-11C, the articles are aligned along a single datum line 900. In other embodiments, articles may be unloaded to align with a plurality of spaced apart datum lines such that articles are placed in several rows. The autonomous unloading operations of the apparatus 100 result in a precise alignment of the articles and also precise spacing D between articles. The precise alignment and spacing provided by the autonomous unloading has the advantage of conserving space at the drop-off location 624, which may accommodate a greater number of articles than if manually placed.

Figure 12:
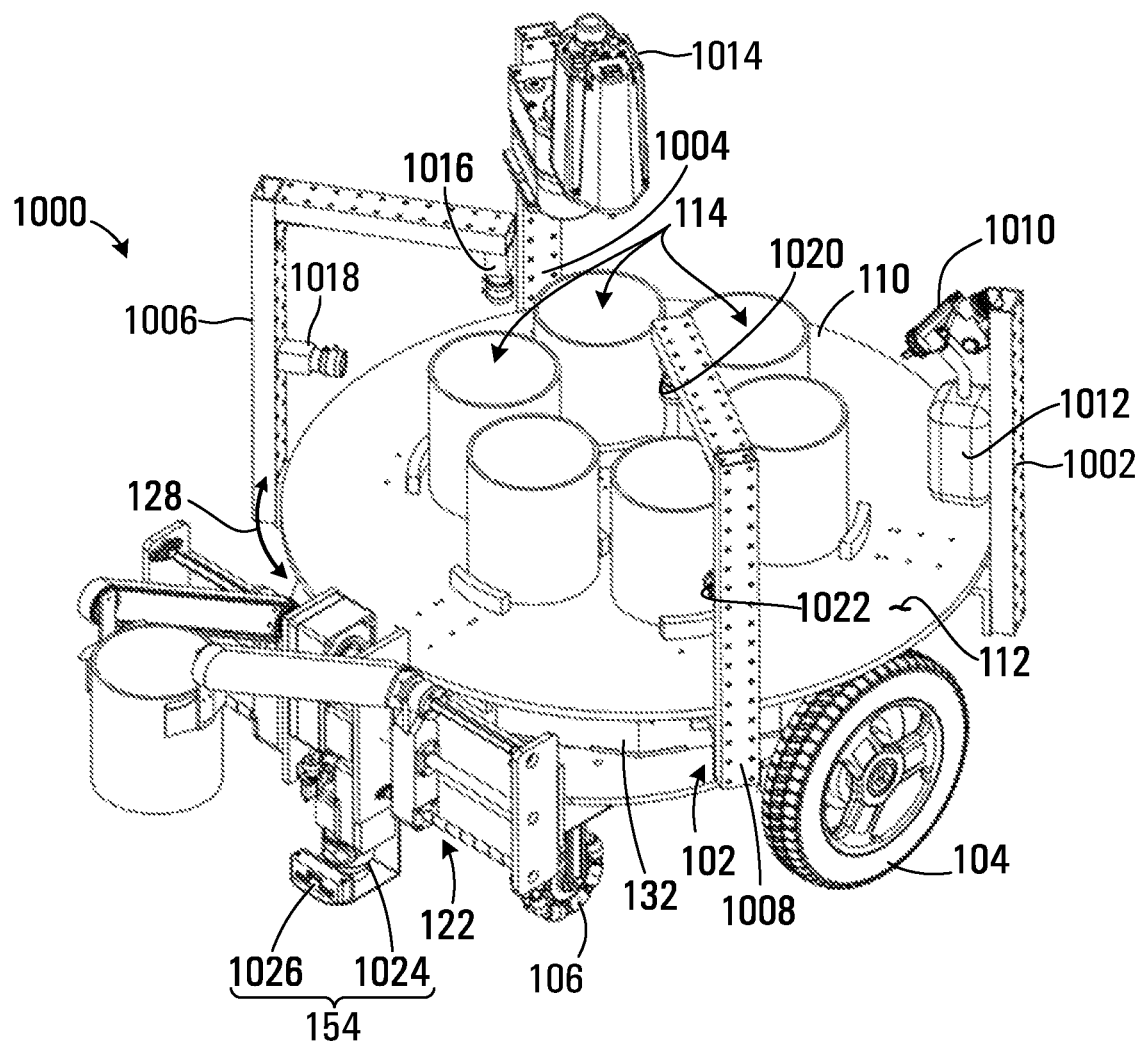
FIG. 12 is a perspective view of an apparatus for transporting a plurality of articles according to an alternative disclosed embodiment.

An alternative embodiment of an apparatus for transporting a plurality of articles is shown in FIG. 12 at 1000. Referring to FIG. 12, the apparatus 1000 includes all of the components of the apparatus 100 shown in FIG. 1, including the wheeled chassis 102 having drive wheels 104 and castor wheels 106, the base 132 and platform 110, and the manipulator 122. The apparatus 1000 further includes one or more tools operably configured to perform an operation on the plurality of articles 114 while being transported on the wheeled chassis 102. In the embodiment shown, a plurality of tool supports 1002, 1004, 1006, and 1008 are coupled to the base 132. The tool support 1002 has a spraying tool 1010 mounted on the support. The spraying tool 1010 is operable to draw a liquid plant protection product, such as a pesticide, contained in a reservoir 1012 and to spray the liquid onto a plant articles in the plurality of articles 114 disposed in a path of the spray. The tool support 1004 has a robotic arm 1014 mounted on the support. In one embodiment the robotic arm 1014 may be an articulated robot such as a SCARA (Selective Compliance Articulated Robot Arm), which is simple to mount on the tool support 1004 and has a small footprint. In embodiments where the articles 114 are plant pots operations such as trimming, sticking, or other operations may be performed by the articulated robot. The apparatus 1000 also includes a plurality of cameras 1018, 1020, 1022, and 1024 mounted on respective supports 1006 and 1008, which are operable to generate images facilitating inspection of the plurality of articles 114. In other embodiments, the apparatus 1000 may only have a single tool and tool support. Alternatively, in some embodiments more than four tools may be provided.

Further examples of tools that me be mounted on one of the plurality of tool supports 1002-1008, include a labeling machine, a 3D printer head, a drilling and/or milling machine, a cutting and trimming machine, a monitoring apparatus, etc.

Actuation of the platform actuator 140 causes the platform 110 to rotate in the direction 128 to dispose successive articles in the plurality of articles 114 to be operated on by the spraying tool 1010, robotic arm 1014, and inspection cameras 1016-1022. In the embodiment shown where the base 132 is rotatable with respect to the wheeled chassis 102, the plurality of tool supports 1002-1008 would thus also move with the base. As an alternative, the platform 110 may be held in a fixed rotational orientation while the base 132 is rotated to cause the tools, 1012, 1014, and 1016-1022 to be successively disposed to perform operations on each of the plurality of articles 114. In the embodiment described above where the platform is not rotatable, the rotatable base 132 would thus provide for rotational movement to dispose each tool to operate on the articles. In the other disclosed embodiment, where the base 132 is fixed and the manipulator 122 is thus not moveable w.r.t. the wheeled chassis 102, rotational movement of the platform 110 thus disposes each of the plurality of articles 114 to be operated on by each tool.

The upper surface 112 of the platform 110 thus accommodates several articles on which operations can be performed while the apparatus 100 is moving between the pickup location 602 and the drop-off location 624. This has the advantage over prior-art systems that need to transport articles to a fixed station where operations are performed on the plurality of articles 114 before transporting the articles to the drop-off location 624. The relatively large upper surface 112 of the platform 110 also accommodates several articles (in this case 6 articles) for both transport to the drop-off location 624 and simultaneous performing of operations using the tools 1012, 1014, and 1016-1022.

In FIG. 1, the proximity sensor 154 of the apparatus embodiment 100 was disclosed as being implemented using a single LIDAR sensor. In the apparatus embodiment 1000 shown in FIG. 12, the proximity sensor 154 is implemented using a LIDAR sensor 1024 and an infrared sensor 1026, where the infrared sensor 1026 performs close range proximity detection and the LIDAR sensor performs mid-range and long-range proximity detection. Some LIDAR sensors do not provide sufficient resolution for close range objects, while new LIDAR sensors that have recently become available may provide sufficient resolution at close range. As an example, the infrared sensor 1026 may be used for detection of objects within a range of about 100 cm, while the LIDAR sensor 1024 may be used to cover ranges between about 15 cm and 6 meters.

Referring back to FIG. 1, the apparatus 100 may further include a pair of spaced apart mounts 162 and 164 that carry the respective UWB transceivers 416 and 417 (shown in FIG. 6). The UWB transceivers 416 and 417 are operable to receive and/or transmit radio frequency (RF) positioning signals. Ultra-wideband transceivers use a low energy level RF pulse transmission over a wide bandwidth for short-range communications and are commonly used in precision locating and tracking applications. UWB pulses have low energy and in addition to requiring less operating power, also generally do not conflict with other wireless signals. In the embodiment shown, the UWB transceivers 416 and 417 are implemented using the DWM1000 UWB wireless transceiver module manufactured by DecaWave of Dublin, Ireland, which facilitates location of objects to a precision of about 10 centimeters indoors over a range of up to about 300 meters. For the UWB transceivers 416 and 417 on the apparatus 100, the DWM1000 module is configured as a "tag", for which the position is to be tracked.

Figure 13:
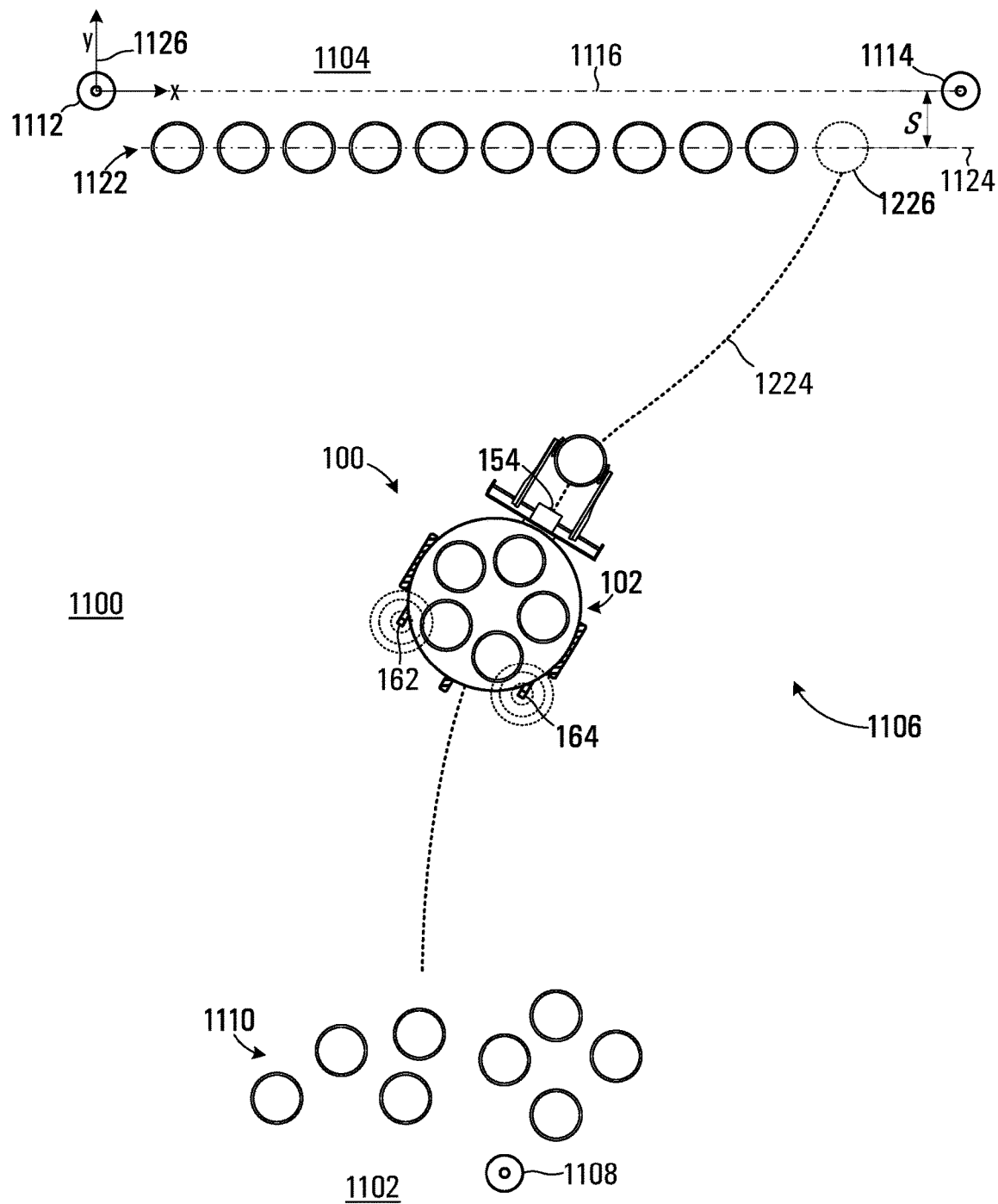
FIG. 13 is a plan view of a positioning system for determining a position of the apparatus shown in FIG. 1 within an area.

FIG. 13 shows a plan view of an area 1100 such as a plant nursery floor. A plurality of articles (in this case, plants in pots) are to be transported on the wheeled chassis 102 of the apparatus 100 between a pickup location 1102 and an intended drop-off location 1104 within the area 1100. Referring to FIG. 13, a positioning system shown generally at 1106 includes a pickup beacon 1108 positioned proximate a plurality of articles 1110 at the pickup location 1102. The positioning system 1106 also includes a left drop-off beacon 1112 positioned proximate the intended drop-off location 1104 and a right drop-off beacon 1114 positioned proximate drop-off location 1104. The left drop-off beacon 1112 and right drop-off beacon 1114 define a datum 1116 for indicating a desired alignment of articles at the drop-off location 1104.

Each of the beacons 1108, 1112, and 1114 includes a transceiver for receiving and/or transmitting positioning signals. In one embodiment of the positioning system 1106, the beacons 1108, 1112, and 1114 may also each include a DWM1000 UWB wireless transceiver module configured as an "anchor", which provides fixed reference points for locating the apparatus 100 within the area 1100. The UWB transceivers 416 and 417 and the UWB transceivers on each beacon 1108, 1112, and 1114 each include a wireless interface, and are able to transmit and receive data signals from each other including timing information. In one embodiment communications between the UWB transceivers 416 and 417 and the UWB transceivers on each beacon 1108, 1112, and 1114 may be in accordance with the IEEE 802.15.4 protocol for low-rate wireless personal area networks. The UWB transceivers 416 and 417 on the apparatus 100 are in communication with the on-board controller 160 via a USB interface 412, as shown in FIG. 6.

Advantageously, the UWB transceivers 416 and 417 and the UWB transceivers on the beacons 1108, 1112, and 1114 provide accurate real time positioning of the apparatus 100 within a workspace that does not rely on tracking movements of the drive wheels 104 or hub drive 150.

The pickup beacon 1108 is used to generally indicate the pickup location 1104 where the plurality of articles 1110 are located. In this embodiment the datum 1116 provided by the left drop-off beacon 1112 and right drop-off beacon 1114 indicate a desired alignment of a plurality of articles 1122 at the drop-off location 1106. In FIG. 13 articles in the plurality of articles 1122 that have already been unloaded have been aligned along a line 1124, which is spaced apart from the datum 1116 by a distance S.

In order to determine the position of the UWB transceivers 416 and 417 it is necessary to first establish the location of each of the beacons 1108, 1112, and 1114 in a local coordinate frame 1126. In one embodiment, the beacons 1108, 1112, and 1114 may be placed at arbitrary fixed positions and the UWB transceivers 416 and 417 and on-board controller 160 may be configured to locate each of the beacons within the local coordinate frame 1126.

Figure 14:
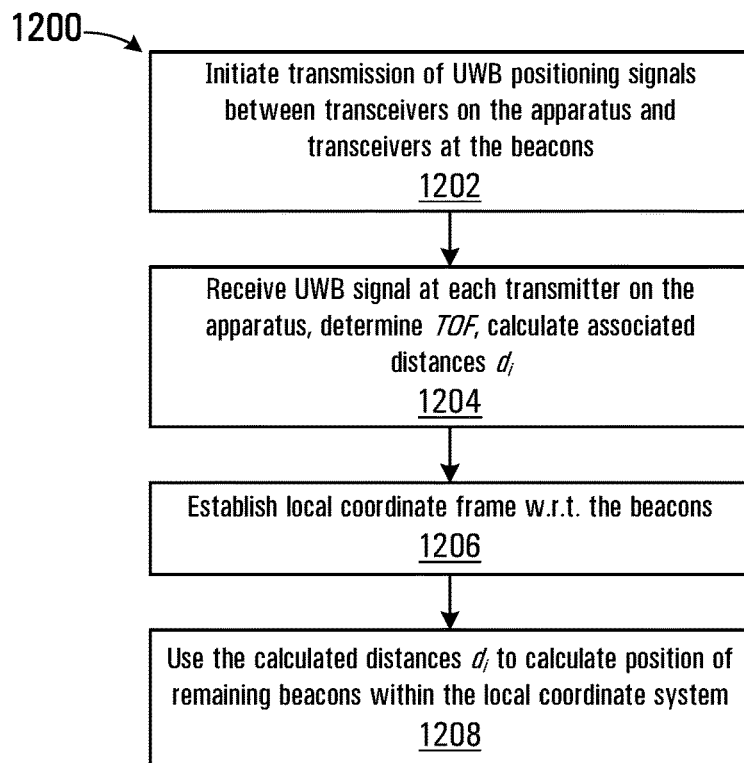
FIG. 14 is a flowchart depicting blocks of code for directing a controller to locate arbitrarily positioned beacons of the positioning system shown in FIG. 13.

Referring to FIG. 14, a flowchart depicting blocks of code for directing the controller 160 to locate arbitrarily positioned beacons 1108, 1112, and 1114 in the local coordinate frame 1126 is shown generally at 1200. The process 1200 begins at block 1202, which directs the controller 160 to cause the UWB transceivers 416 and 417 on the apparatus 100 to initiate transmission of positioning signals, which are received by the UWB transceivers on each beacon 1108, 1112, and 1114. The UWB transceivers transmit signals over a wide bandwidth, which is equivalent to transmission of a very precise narrow pulse (about 1 nanosecond) in the time domain and facilitates accurate determination of a time of flight (TOF) for each transmitted pulse. In one embodiment the UWB transceivers may implement two-way ranging in which the transceivers exchange timing information over several transmissions between the transceivers to provide for precise TOF measurements. Signals received back at the transceivers 416 and 417 from the beacons 1108, 1112, and 1114 are processed to calculate distances $d_i$ corresponding to the determined TOF for each pulse transmission. The distances between each beacon are given by:

$$d_i = TOF * c; \qquad \text{Eqn 1}$$

where $d_i$ is the calculated distance and c is the speed of light. When two-way ranging is implemented, each distance $d_i$ is calculated based on several transmissions between transceivers, and thus provides an improved distance measurement between beacons. As described above in connection with FIG. 6, the UWB transceivers 416 and 417 are in communication with the microprocessor 400 of the on-board controller 160 and the TOF and/or the distances $d_i$ are thus made available to the controller 160 for further processing via the USB interface 412 to the transceivers. In some embodiments the on-board controller 160 may receive TOF information and calculate the distances at the controller. In other embodiments received position data may already be converted into distances.

Block 1206 then directs the controller 160 to establish the local coordinate frame 1126 with respect to the beacons 1108, 1112, and 1114. This involves designating one beacon as an origin of the local coordinate frame 1126 (in this case the left drop-off beacon 1112), designating another beacon as defining a direction of the positive x-axis (in this case the right drop-off beacon 1114), and establishing the y-axis perpendicular to the x-axis. Block 1208 then directs the controller 160 to use the calculated distances to determine the position of the remaining beacons (i.e. in this case the beacon 1108) within the local coordinate frame 1126. The beacons 1108, 1112, and 1114, while placed in arbitrary positions thus facilitate establishment of a fixed frame of reference 1126 for the positioning system 1106.

Figure 15:
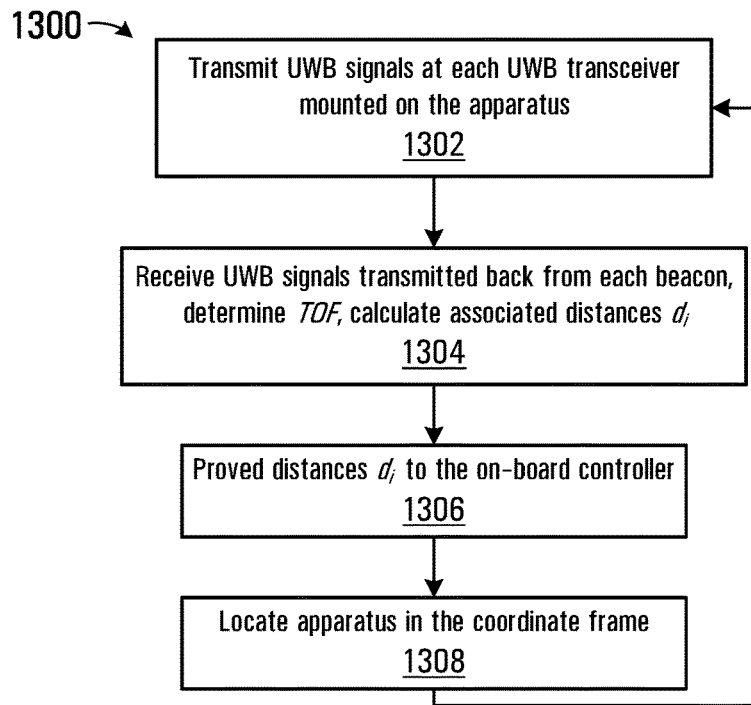
FIG. 15 is a flowchart depicting blocks of code for directing the controller and the processor circuit shown in FIG. 6 to locate arbitrarily positioned beacons of the positioning system.

Referring to FIG. 15, a flowchart depicting blocks of code for directing the on-board controller 160 of the apparatus 100 determine its position within the area 1100 is shown generally at 1300. The process 1300 begins at block 1302, which directs the microprocessor 400 of the on-board controller 160 to cause the UWB transceivers 416 and 417 to transmit positioning pulses, generally as described above. The transmission of the positioning pulses, when received at the beacons 1108, 1112, and 1114 cause transmission of return positioning pulses from the beacons including data related to the TOF associated with the pulse transmission. The process 1300 then continues at block 1304, where the positioning pulses are received back at the UWB transceivers 416 and 417 and three distances $d_i$ are calculated for each of the UWB transceivers based on the determined TOF as described above.

At block 1306, the distances $d_i$ are provided to the microprocessor 400 for further processing. Block 1308 then directs the microprocessor 400 to uniquely locate the UWB transceivers 416 and 417 in the local coordinate frame 1126 with respect to the beacons 1108, 1112, and 1114. The location process generally involves finding the intersection between circles centered at each of the beacons 1108, 1112, and 1114 and having a respective radius of $d_i$. In practice, noise and other errors will likely not yield a unique intersection point, but probabilistic methods such as a least squares approximation may be used to provide a relatively precise estimate of the location of each sensor. If a more a precise estimation of the location of the sensors 416 and 418 is required, an additional beacon (not shown) may be added to further reduce uncertainties associated with the position calculation. The process 1300 will generally be repeated at a repetition rate sufficient to locate the apparatus 100 in real-time or near-real time, while reducing the power consumption of the transceivers that may be powered by batteries.

The apparatus 100 may use the positional information for navigating the wheeled chassis to pick up articles from the plurality of articles 1110 at the pickup location 1104 and to move between the pickup location and the drop-off location 1106, and to place articles in the plurality of articles proximate the destination location. The position of the apparatus 100 may be derived from the positions of the UWB transceivers 416 and 417, for example by taking a midpoint between the positions for each of the UWB transceivers 416 and 417 or some other reference point on the wheeled chassis 102. Additionally, the respective positions provided for the spaced apart mounts 162 and 164 provide sufficient separation between the UWB transceivers 416 and 417 to permit determination of an orientation or heading of the apparatus 100 within the local coordinate frame 1126 for the positioning information provided by the respective transceivers.

In one embodiment, the real-time location and orientation provided by the positioning system may be used for steering the wheeled chassis along a path 1224 between the pickup location 1104 and drop-off location 1106. Additionally, the LIDAR proximity sensor 154 may simultaneously receive proximity signals indicative of obstacles in the path of the wheeled chassis 102. The microprocessor 400 may use the received proximity signals from the LIDAR proximity sensor 154 and the positional information provided by the positioning system to modify the path 1224 of the wheeled chassis to avoid detected obstacles.

When the wheeled chassis 102 is within a pre-determined range of the pickup location 1104, the proximity signals received from the proximity sensor 154 may be processed by the microprocessor 400 to determine whether obstacles in the path of the wheeled chassis 102 correspond to any of the plurality of articles 1110 to be transported, and in response causing the wheeled chassis to steer towards one of the articles in the plurality of articles. In general, LIDAR and/or other proximity signals provided by the proximity sensor 154 may be used in combination with data provided by the UWB transceivers 416, 417 on the apparatus 100 and the UWB transceivers on each beacon 1108, 1112, and 1114 to provide details of the environment, articles 1110 and 1122, obstacles, and the position of the apparatus 100 within the area 1100. Based on this information, the apparatus 100 may determine the path 1224 and make necessary adjustments to the path during movement.

Similarly, when path 1224 of the wheeled chassis 100 is within a pre-determined range of the drop-off location 1106, the microprocessor 400 may cause the wheeled chassis 102 to steer to a first location defined with respect to the second beacon 1114 (and/or the first beacon 1112) for unloading a first article at the 1106. Subsequently, for additional articles in the plurality of articles 1110 the microprocessor 400 may cause the wheeled chassis to steer to successive locations (for example the location 1226) defined with respect to the first and second beacons 1112 and 1114 for unloading of subsequent articles in the plurality of articles.

While specific embodiments have been described and illustrated, such embodiments should be considered illustrative of the invention only and not as limiting the invention as construed in accordance with the accompanying claims.

What is claimed is:

1. An apparatus for transporting a plurality of articles, the apparatus comprising:
    a wheeled chassis;
    a platform disposed on the wheeled chassis;
    a manipulator coupled to the wheeled chassis and operably configured to:
        load a first article of the plurality of articles at a first position on the platform; or
        unload the first article of the plurality of articles from the first position on the platform; and
    at least one actuator operably configured to cause successive relative rotational movements between the manipulator and the platform to provide access to successive rotationally spaced apart positions on the platform for loading or unloading each subsequent article in the plurality of articles.

2. The apparatus of claim 1 wherein the at least one actuator is operably configured to cause one of a rotary movement of the platform about the wheeled chassis and a rotary movement of the manipulator about the wheeled chassis.

3. The apparatus of claim 1 wherein the manipulator is coupled to base rotatable with respect to the wheeled chassis and wherein the at least one actuator comprises:
 a base actuator operably configured to cause rotary movement of the base and the manipulator about the wheeled chassis;
 a platform actuator operably configured to cause rotary movement of the platform about the wheeled chassis; and
 wherein the base actuator and the platform actuator are operable to cause successive relative rotational movements of both the manipulator and the platform about the wheeled chassis for providing access for loading or unloading each subsequent article in the plurality of articles.

4. The apparatus of claim 3 wherein the manipulator is coupled to the wheeled chassis via a support and wherein the base actuator is operably configured to cause rotary movement of the support about the wheeled chassis.

5. The apparatus of claim 3 wherein the wheeled chassis comprises at least one drive for driving wheels of the wheeled chassis and further comprising a controller operably configured to:
 cause the at least one drive to orient the wheeled chassis for movement in a direction aligned to pick up or place the plurality of articles in a line;
 cause the base actuator to cause rotary movement of the manipulator about the wheeled chassis to orient the manipulator for loading or unloading the plurality of articles; and
 cause the platform actuator to cause rotary movement of the platform to:
  after loading each article, dispose an empty location on the platform in reach of the manipulator for loading a subsequent article; or
  dispose a subsequent article on the platform in reach of the manipulator for unloading.

6. The apparatus of claim 1 wherein the wheeled chassis comprises a drive for driving at least one wheel of the wheeled chassis and further comprising a controller operably configured to control the drive to orient the wheeled chassis to align the manipulator for loading or unloading each of the first article and the subsequent articles.

7. The apparatus of claim 1 wherein the manipulator comprises:
 a pair of outwardly directed spaced apart arms operably configured to grasp the article;
 an arm actuator, operably configured to vertically rotate the arms toward the platform while the article is suspended between the arms; and
 an end effector distally disposed on each respective arm and wherein the end effectors are operably configured to grasp the article and suspend the article during vertical movement of the arms.

8. The apparatus of claim 7 wherein the arms are mounted for vertical rotation on a driven shaft and wherein the end effectors are coupled to the shaft via a belt such that rotation of the arms causes a respective rotation of the end effectors for maintaining an orientation of the end effectors while grasping the article.

9. The apparatus of claim 7 wherein the arms are mounted for one of lateral movement and rotational movement about a pivot to cause the pair of end effectors to move to grasp or release the article.

10. The apparatus of claim 1 further comprising at least one tool operably configured to perform an operation on the articles while transporting the plurality of articles on the wheeled chassis.

11. The apparatus of claim 10 wherein the at least one tool is coupled to the manipulator such that causing rotary movement between the manipulator and the platform provides access to each article for performing the operation.

12. The apparatus of claim 11 wherein the manipulator and the at least one tool are respectively coupled to a common base mounted for rotation on the wheeled chassis such that rotary movement of the common base causes rotary movement of each of the manipulator and the at least one tool.

13. The apparatus of claim 10 wherein the at least one tool is coupled to the wheeled chassis such that causing rotary movement between the wheeled chassis and the platform provides access to each article for performing the operation.

14. The apparatus of claim 1 wherein the platform comprises a plurality of article supports for receiving and supporting the article.

15. A method of transporting a plurality of articles on a wheeled chassis, the method comprising:
 causing a manipulator coupled to the wheeled chassis to:
  load a first article of the plurality of articles at a first position on a platform disposed on the wheeled chassis; or
  unload the first article of the plurality of articles from the first position on the platform; and
 causing successive relative rotational movements between the manipulator and the platform to provide access to successive rotationally spaced apart positions on the platform; and
 causing the manipulator to load or unload each subsequent article of the plurality of articles to or from the successive rotationally spaced apart positions on the platform.

16. The method of claim 15 wherein causing successive relative rotational movements comprises one of causing rotary movement of the platform about the wheeled chassis and causing rotary movement of the manipulator about the wheeled chassis.

17. The method of claim 16 wherein causing successive relative rotational movements comprises causing rotary movement of both the manipulator and the platform about the wheeled chassis.

18. The method of claim 17 wherein causing rotary movement of both the manipulator and the platform about the wheeled chassis comprises:
 causing the wheeled chassis to be aligned for movement in a direction aligned to pick up or place the plurality of articles along a line;
 causing rotary movement of the manipulator to orient the manipulator for loading or unloading the plurality of articles; and
 causing rotary movement of the platform to:
  after loading each article, dispose an empty location on the platform in reach of the dispose a subsequent article on the platform in reach of the manipulator for unloading.

19. The method of claim 15 further comprising controlling a drive associated with at least one wheel of the wheeled chassis to orient the wheeled chassis to align the manipulator for loading each of the first article and the subsequent articles.

20. The method of claim 17 further comprising operating at least one tool to perform an operation on the articles while transporting the plurality of articles on the wheeled chassis.

21. The method of claim 20 wherein operating the at least one tool comprises causing rotational movement between the at least one tool and the platform to provide access to each article for performing the operation.

22. The method of claim 21 wherein causing rotational movement between the at least one tool and the platform comprises causing rotational movement of the manipulator, the at least one tool being coupled to the manipulator.

23. The method of claim 15 wherein the platform comprises a plurality of article supports for receiving and supporting the article and wherein causing a manipulator to load or unload the first article comprises causing the manipulator to load or unload the first article from a first article support.

\* \* \* \* \*